US007254594B2

(12) United States Patent
Allen et al.

(10) Patent No.: US 7,254,594 B2
(45) Date of Patent: *Aug. 7, 2007

(54) METHOD AND APPARATUS FOR PROCESS DESIGN

(75) Inventors: Kenneth R. Allen, Edgewood, KY (US); John Prouty, Portland, OR (US); David E. Wheeler, Colorado Springs, CO (US)

(73) Assignee: Metapower, LLC., Vancouver, WA (US)

( * ) Notice: Subject to any disclaimer, the term of this patent is extended or adjusted under 35 U.S.C. 154(b) by 462 days.

This patent is subject to a terminal disclaimer.

(21) Appl. No.: 10/861,723

(22) Filed: Jun. 4, 2004

(65) Prior Publication Data
US 2004/0220953 A1    Nov. 4, 2004

(51) Int. Cl.
*G06F 17/30*    (2006.01)
(52) U.S. Cl. .................................................. 707/203
(58) Field of Classification Search .................. 707/1, 707/2, 203
See application file for complete search history.

(56) References Cited

U.S. PATENT DOCUMENTS 4,325,120 A    4/1982    Colley et al. ............... 364/200
5,204,897 A    4/1993    Wyman ........................ 380/4
5,325,120 A    6/1994    Kuehnle
5,734,837 A    3/1998    Flores et al.
5,787,444 A    7/1998    Gerken et al. .............. 707/203
5,826,239 A    10/1998   Du et al.
5,903,720 A    5/1999    Stokes ........................ 395/186
6,012,152 A    1/2000    Douik et al. .................. 714/26
6,073,109 A    6/2000    Flores et al. .................. 705/8
6,349,238 B1   2/2002    Gabbita et al. ............. 700/101
6,377,993 B1   4/2002    Brandt et al. ............... 709/227

FOREIGN PATENT DOCUMENTS

WO    WO02/01320    1/2002

OTHER PUBLICATIONS

Marshak, R.T.; "IBM's Flowmark Object-Oriented Workflow for Mission-Critical Workflow for Mission-Critical Applications"; Workgroup Computing Report; v. 17, No. 5; May 1, 1994; pp. 3-13.
Leymann, et al.; "Business Process Management with FlowMark"; IBM Germany Development, Inc.; IEEE; Feb. 28, 1994; pp. 230-234.

*Primary Examiner*—Etienne P LeRoux
(74) *Attorney, Agent, or Firm*—Marger, Johnson & McCollom, P.C.

(57)    ABSTRACT

A process is managed by creating a future revision of a base. Data are input into the future revision of the base. The future revision of the base is made current, revising the base. A control tracks the authorization of the base revision, storing the authorization of the future revision of the base.

38 Claims, 31 Drawing Sheets

METHOD AND APPARATUS FOR PROCESS DESIGN

RELATED APPLICATION DATA

This application claims priority from U.S. Provisional Application No. 60/214,495, filed Jun. 27, 2000, incorporated by reference.

FIELD OF THE INVENTION

This invention pertains to a computerized method and database for process design.

BACKGROUND OF THE INVENTION

Tracking business processes traditionally is a data-oriented activity. This makes sense: processes are all about manipulating data, so orienting the process around how the data are tracked is an intuitive solution. For example, consider an organization chart. As shown in FIG. 1, organization chart 105 typically includes a chief executive officer 110, along with other officers not shown in FIG. 1. Eventually, somewhere down the hierarchy, are the departments. FIG. 1 shows three departments: Department A 115, Department B 120, and Department C 125. Each department includes some employees, shown by employee lists 130, 135, and 140, respectively.

Now consider what happens when an employee changes department. For example, consider Employee 5 moving from Department A 115 to Department B 120, as shown by arrow 145. Traditionally, Employee 5 is deleted from employee list 130 and added to employee list 135.

But what if Employee 5 was the only employee who worked on a project assigned to Department A 115 when Employee 5 was with Department A 115? If the project is assigned back to Employee 5, it will be associated with Department B 120, which does not have any familiarity with the project. The wrong department (Department B 120) will be working on the project.

Data changes, such as moving Employee 5 from Department A 115 to Department B 120, typically requires authorization. If authorization and the data change process are tracked at all, the information about the data change is stored as part of the data object. For example, the employee information can store who authorized a promotion or additional training for an employee. But data changes are tracked only in very limited cases, requiring special-purpose implementation every time such information is to be stored. Additionally, the data change information is usually incomplete. Finally, typically the lifecycle of the data change authorization is not tracked.

The present invention addresses these and other problems associated with the prior art.

SUMMARY OF THE INVENTION

The above disconnect created by Employee 5's move to Department B 120 occurs because the traditional model for process management ignores a critical dimension: time. As time passes, the data change. Changes traditionally are not tracked: the database only stores the most current information.

To complete the history, the data change information is retained for all data changes in the system. But the data change information is not stored with the data objects themselves. Instead, the changes are stored separately. The type of information stored about data changes varies little, even if the types of data objects that are changing can vary greatly. For example, whether the data object is an employee or a piece of equipment, the process of changing data about the object still goes through a sequence of steps, such as requesting a change, approving the change, and making the change.

The invention includes an apparatus managing process design in a computer. A computer, including a memory, stores a base and a control operable on the base. When the base needs to be updated, the control is used to revise the base.

The invention also includes a method for managing process design. A future revision of a base is created using a control operable on the base. Data are input into the control and inserted into the future revision. The future revision is then changed to a current revision, making an earlier current revision historic.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
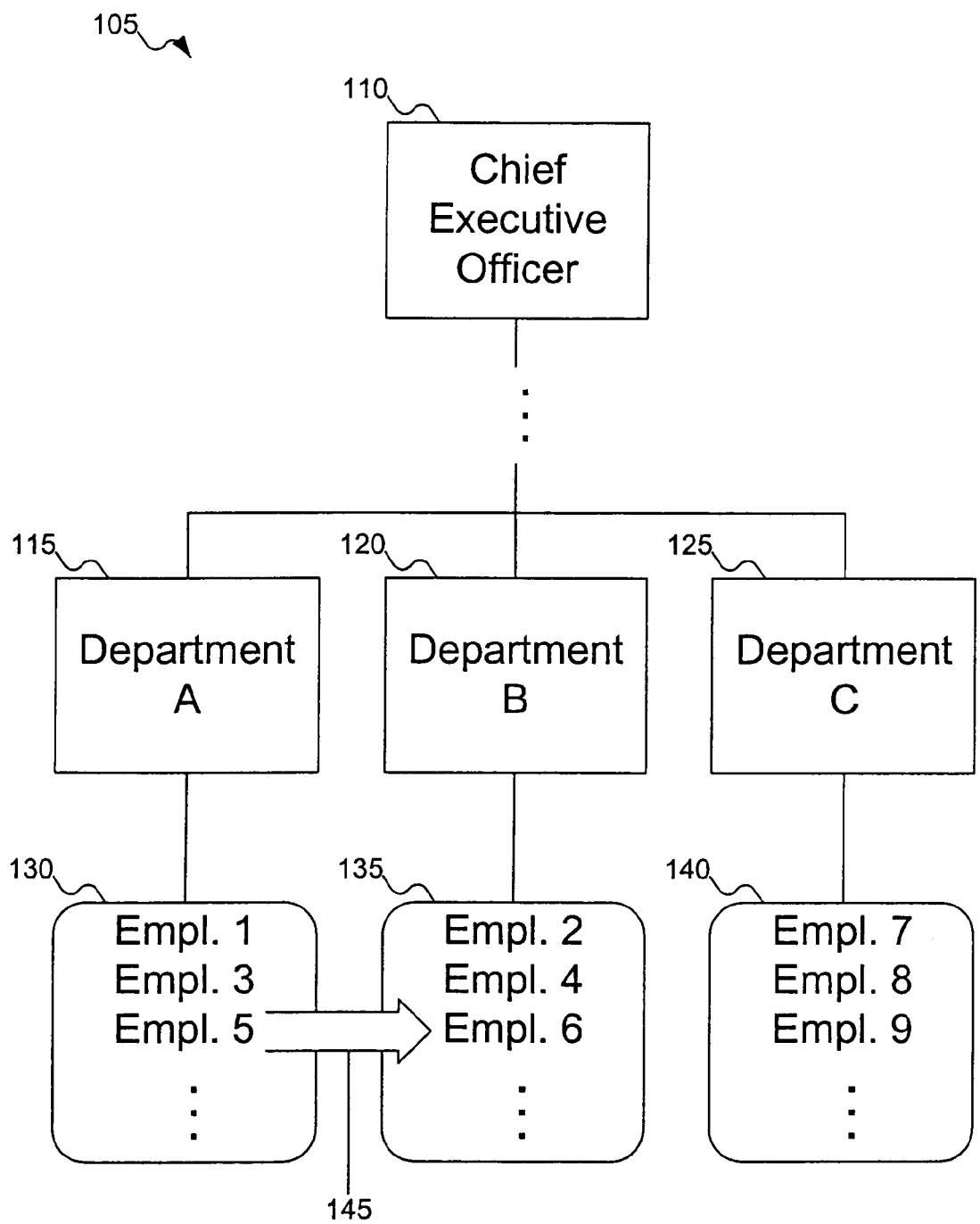
FIG. 1 shows an example of a prior art organization of data.
Figure 2:
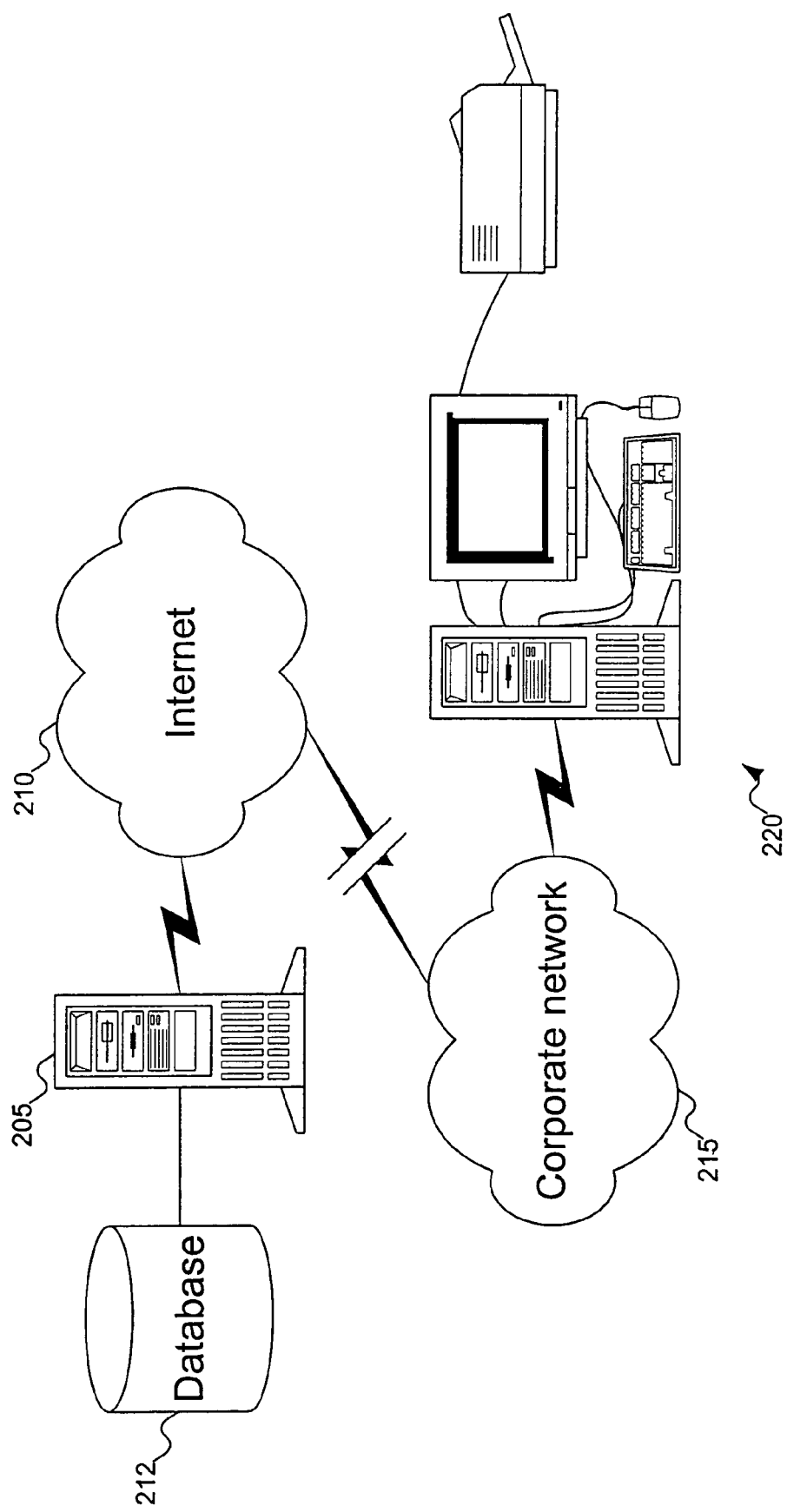
FIG. 2 shows a computer system designed to manage a process design according to the preferred embodiment of the invention.

FIG. 2 shows a computer system designed to manage a process design according to the preferred embodiment of the invention. In FIG. 2, server 205 is a server connected to the Internet 210. Server 205 is accessible via the Internet 210 by any other computer that can access the Internet 210, as is described below. Not shown in FIG. 2 are the normal components of a server, such as a central processing unit, memory, etc.

Server 205 retrieves from and stores to database 212. Database 212 stores information about managing the process design. For example, database 212 stores the data stored in the types and instances of the archetypes (see below with reference to FIG. 10 for more information about types and instances; the archetypes are understood by the server, but are not stored in the database).

Distributed access of the database 212 enables multiple users to access the database 212 without each having to implement an individual process design management database. Since the invention described herein is operable without customization by multiple users, operating database 212 as a distributed database avoids the individual users having to maintain copies of database 212 themselves. Thus, for example, a user on computer system 220 can access database 212 via Internet 210 and corporate network 215. This enables managing process design using an Application Service Provider (ASP) model. Access to data in database 212 can be controlled, so that users cannot see data they should not be allowed to see.

Distributed access of database 212 also enables controls and bases to cross enterprises. It can happen that one enterprise has a base, which is revised using a control of a second enterprise. For example, a business's machine (the first enterprise's base) might be repaired by an outside service company (the second enterprise's control). By enabling distributed access to database 212, cross-enterprise relationships can be represented, which would be difficult to represent using database 212 in a standalone format.

Figure 3:
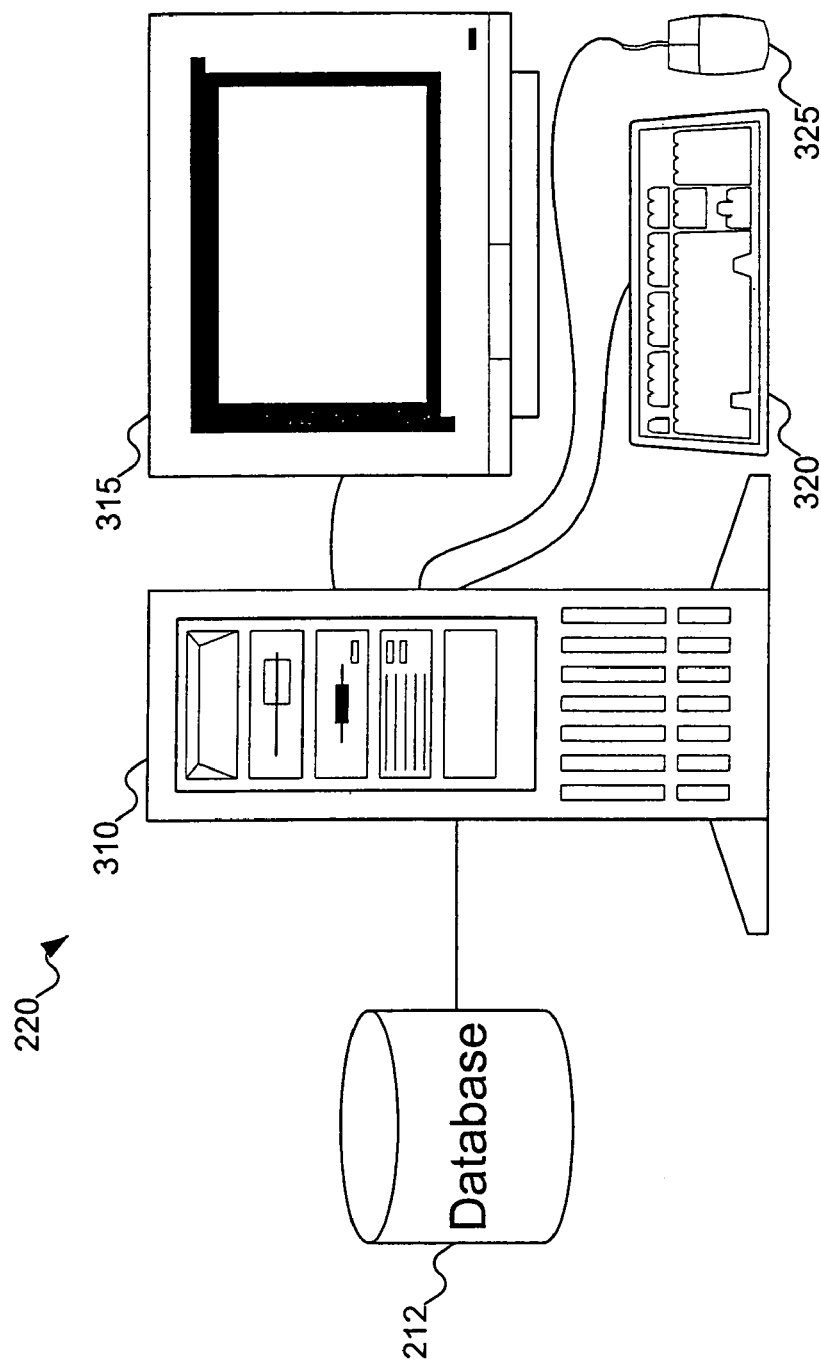
FIG. 3 shows a computer system designed to manage a process design according to an alternative embodiment of the invention.

Although FIG. 2 shows server 205 as a standalone, individual server storing database 212, a person skilled in the art will recognize that other arrangements are possible. For example, server 205 can be part of a storage area network (SAN) that stores database 212 in a distributed manner across Internet 210. FIG. 3 also shows an alternative arrangement for storing database 212 that can be used when process design management is to be implemented without external access to Internet 210.

FIG. 3 shows a computer system designed to manage a process design according to an alternative embodiment of the invention. In the alternative embodiment of FIG. 3, computer 220 is still a company-owned computer. But in FIG. 3, database 212 is accessed directly from computer system 220, rather than being a distributed database accessed via an internetwork. Computer system 220 conventionally includes a computer 310, a monitor 315, a keyboard 320, and a mouse 325. Optional equipment not shown in FIG. 3 can include a printer and other input/output devices. Also not shown in FIG. 3 are the conventional internal components of computer system 220: e.g., a central processing unit, memory, file system, etc.

Figure 4:
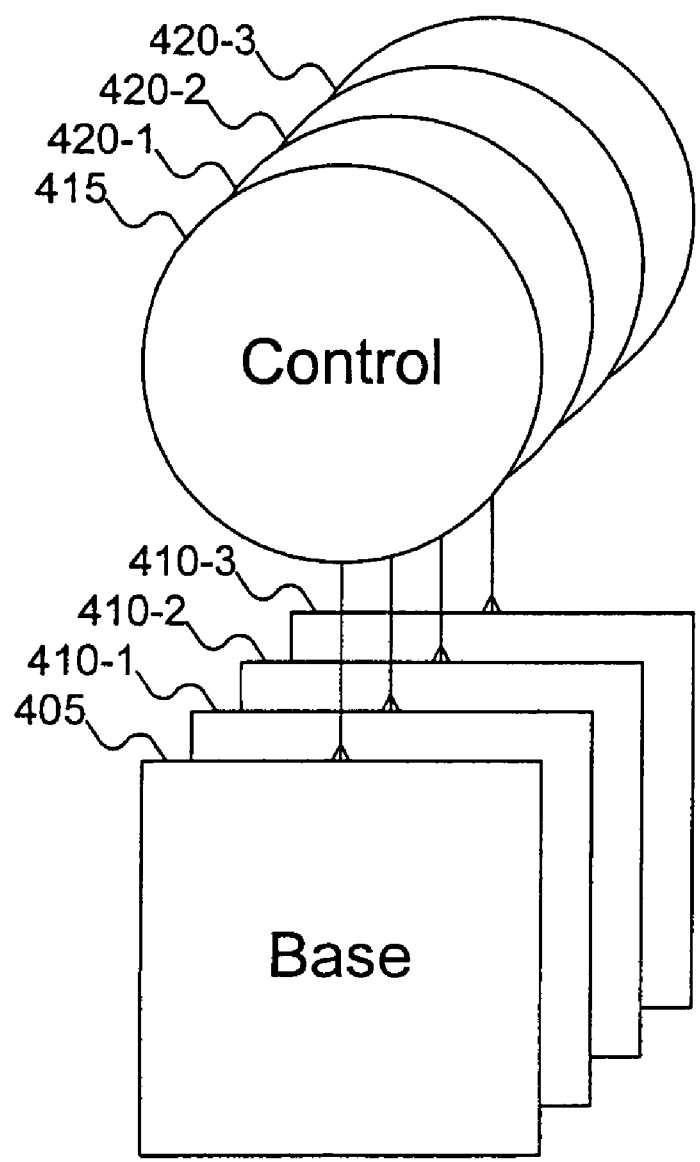
FIG. 4 shows a base controlled by a control according to the preferred embodiment of the invention, usable in the database in the computer system of FIG. 2.

FIG. 4 shows a base controlled by a control according to the preferred embodiment of the invention, usable in the database in the computer system of FIG. 2. In FIG. 4, base 405 is used to store data about an object in the process design. Base 405 is an archetype, used to store data for any type of object in the process design. The other key archetypes, described below in FIGS. 4-9, include control 415, the intersection 515, the observation 615, the transaction 715, the criteria 805, the generator 810, the template 815, and the accumulator 915. Archetypes do not store data directly, but can be thought of as templates from which data-storing models and objects (called types and instances, respectively) are produced. The concepts of archetypes, types, and instances are discussed more with reference to FIG. 10 below. Except with reference to FIG. 10, the remainder of this document will refer only to archetypes. Context will help the reader to determine whether an archetype, type, or instance is actually intended.

Control 415 controls the placement of data in base 405. Although base 405 is used to store data, the data stored in base 405 is not directly modifiable. Instead, control 415 is responsible for modifying base 405 according to the data input. (This is discussed further with reference to FIG. 11 below.) In a similar way, control 415 controls the insertion of data into an intersection, observation, or transaction, as described below.

Both bases, like base 405, and controls, like control 415, go through revisions. That is, they change over time. FIG. 4 graphically represents this with the layering of controls 420-1, 420-2, and 420-3 tied to bases 410-1, 410-2, and 410-3, respectively. In FIG. 4, base 405 is the "current" base, whereas bases 410-1, 410-2, and 410-3 are not "current." Bases 410-1, 410-2, and 410-3 can be bases that are "future" revisions, "historic" revisions, "control" revisions, or "obsolete" revisions. Similarly, control 415 is the "current" control, whereas controls 420-1, 420-2, and 420-3 are not "current." The meanings of "future," "historic," "control," and "obsolete" revisions are discussed more with reference to FIGS. 11 and 15.

Although not shown in FIG. 4, a single control can be responsible for revising data in a number of bases simultaneously. For example, if a business moves from one location to another, all the addresses for the departments are changed. A single control can effect the change of address for each department base, instead of using different controls for each department affected by the move. A person skilled in the art will recognize that this extension is applicable to other archetypes managed by controls.

FIG. 4 shows control 415 as being responsible for revising data in base 405. Controls can also be responsible for revising other controls. How this happens is explained farther with reference to FIG. 16, below.

Figure 5:
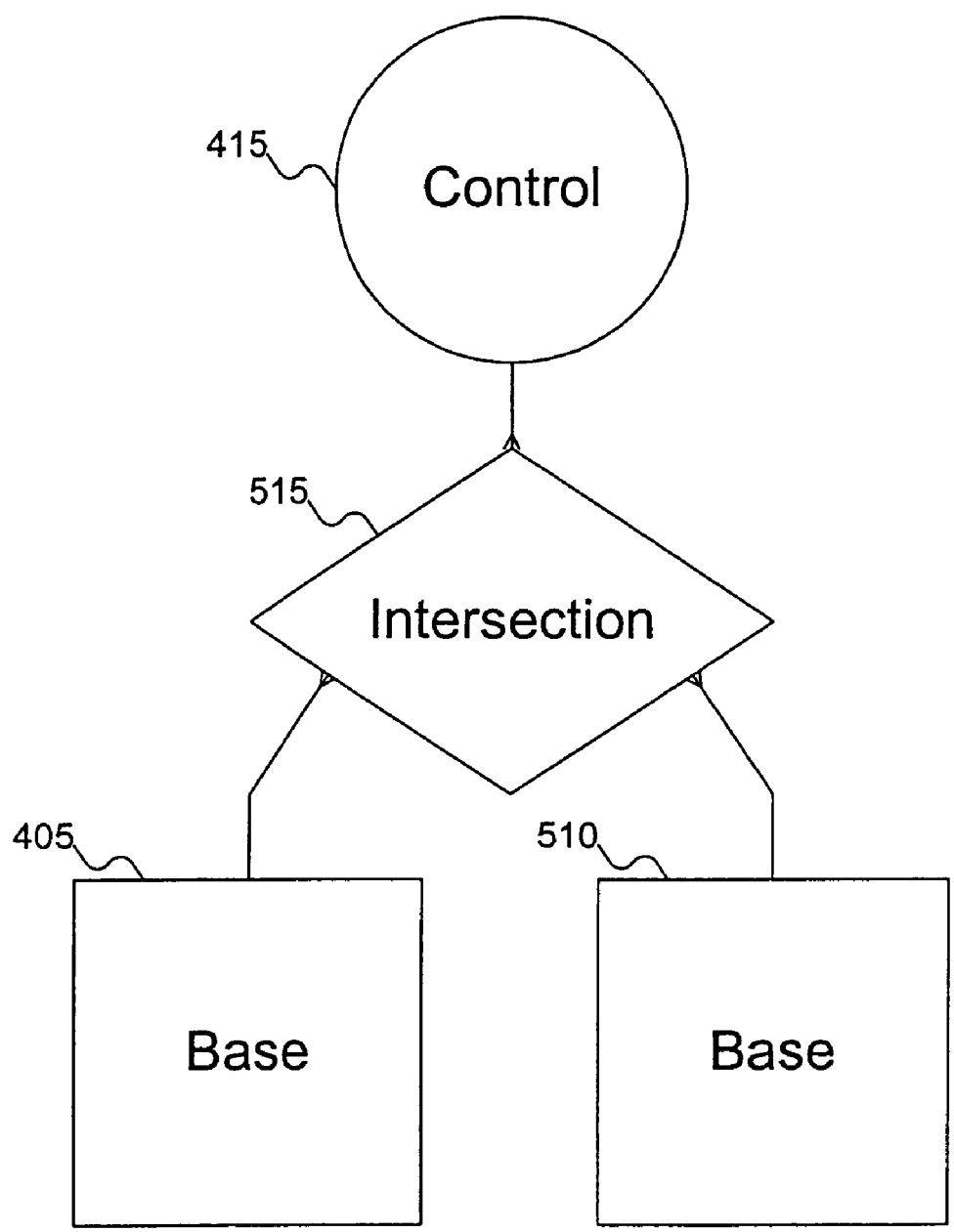
FIG. 5 shows an intersection according to the preferred embodiment of the invention, usable in the database in the computer system of FIG. 2.

FIG. 5 shows an intersection according to the preferred embodiment of the invention, usable in the database in the computer system of FIG. 2. In FIG. 5, intersection 515 correlates two bases 405 and 510. This enables information that spans two concepts to be linked within the database. For example, data about employees can be correlated with data about departments, to specify which employees are working in which departments. Intersection 515 is controlled by control 415. Like bases and controls, intersections can undergo revisions: intersection revisions are discussed further with reference to FIG. 18 below.

Figure 6:
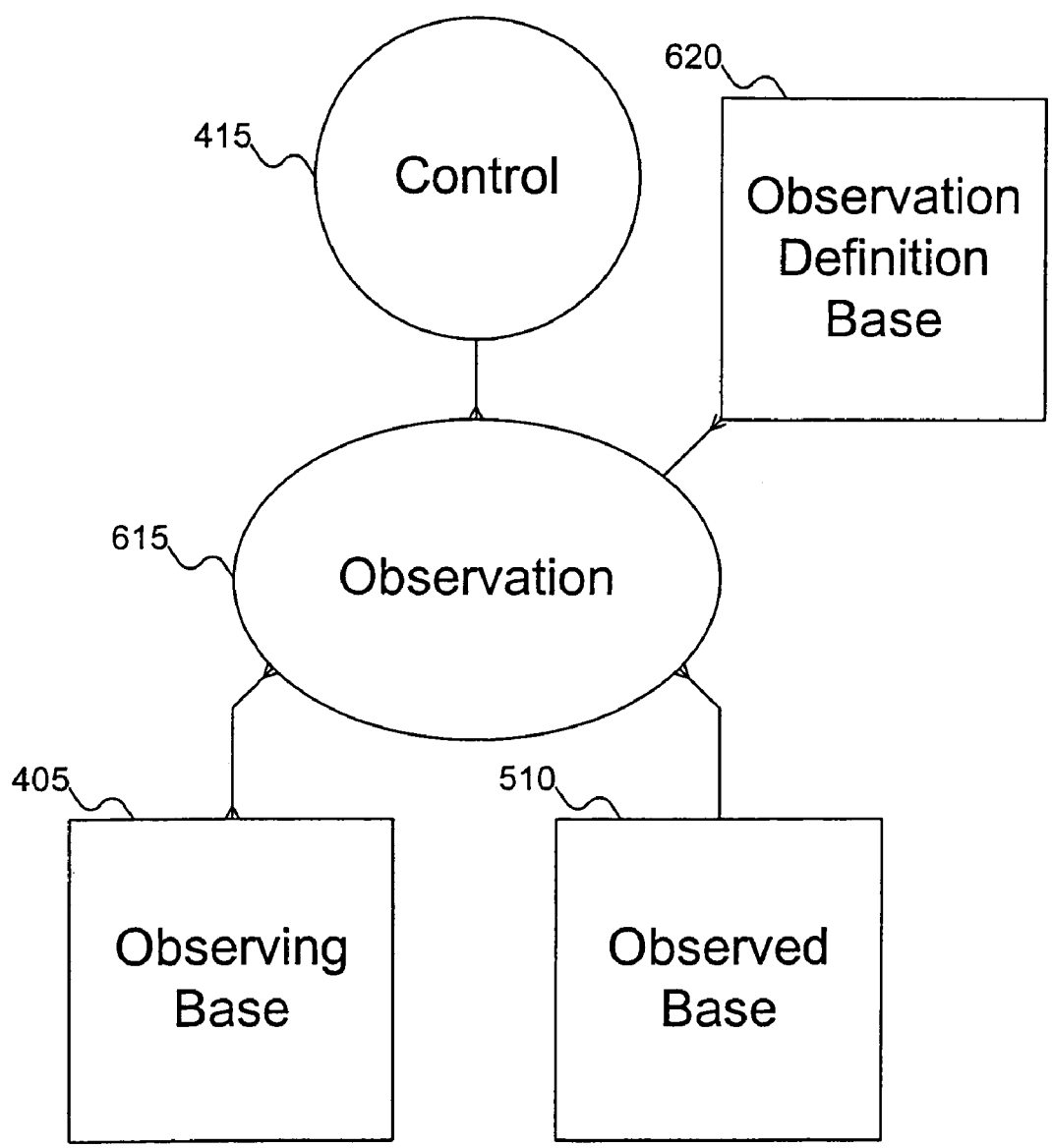
FIG. 6 shows an observation controlled by a control according to the preferred embodiment of the invention, usable in the database in the computer system of FIG. 2.

FIG. 6 shows an observation controlled by a control according to the preferred embodiment of the invention, usable in the database in the computer system of FIG. 2. In FIG. 6, observation 615 is used to observe base 510, from the point of view of base 405. For example, base 510 can describe an automobile engine that has an oil level, and base 405 can describe the person who measures the oil level. Observation 615 is controlled by control 415.

Relevant to an observation are some additional factors. One additional factor relevant to an observation is a tool used in taking the measurement. For example, the gas station attendant measuring the oil level in the automobile engine can use a tool determine the volume of oil in the automobile engine. Each tool is an observing base. Thus, there can be multiple bases observing observed base 510.

A person skilled in the art will recognize that although the tool used in the above automobile engine example is typically a mechanical device (i.e., a dipstick), other types of tools can be used. Tools can be more complicated than a simple dipstick, and can be other than mechanical (e.g., electrical) in operation. The accuracy of the tool's calibration is relevant, regardless of the tool's specifics.

A second factor relevant to an observation is any external conditions applicable to the observation. External conditions are part of the observation, and can affect the conclusions drawn from the observation. For example, whether the automobile engine is cold or hot can affect any conclusions drawn from the measurement. If the car engine is hot, the observation can indicate that there is more oil in the car than is actually present. Or, depending on the particular model of automobile, an observed amount of oil may be too much, too little, or enough. To draw an accurate conclusion from an observation, parameters describing the conditions are used. Observation definition base 625 identifies what types of bases are used to perform the observation and stores the parameters needed to define the conditions. Observation definition base 625 also identifies which bases are needed to observe observed base 510. A person skilled in the art will recognize that observation definition base 625 can define many observations.

Figure 7:
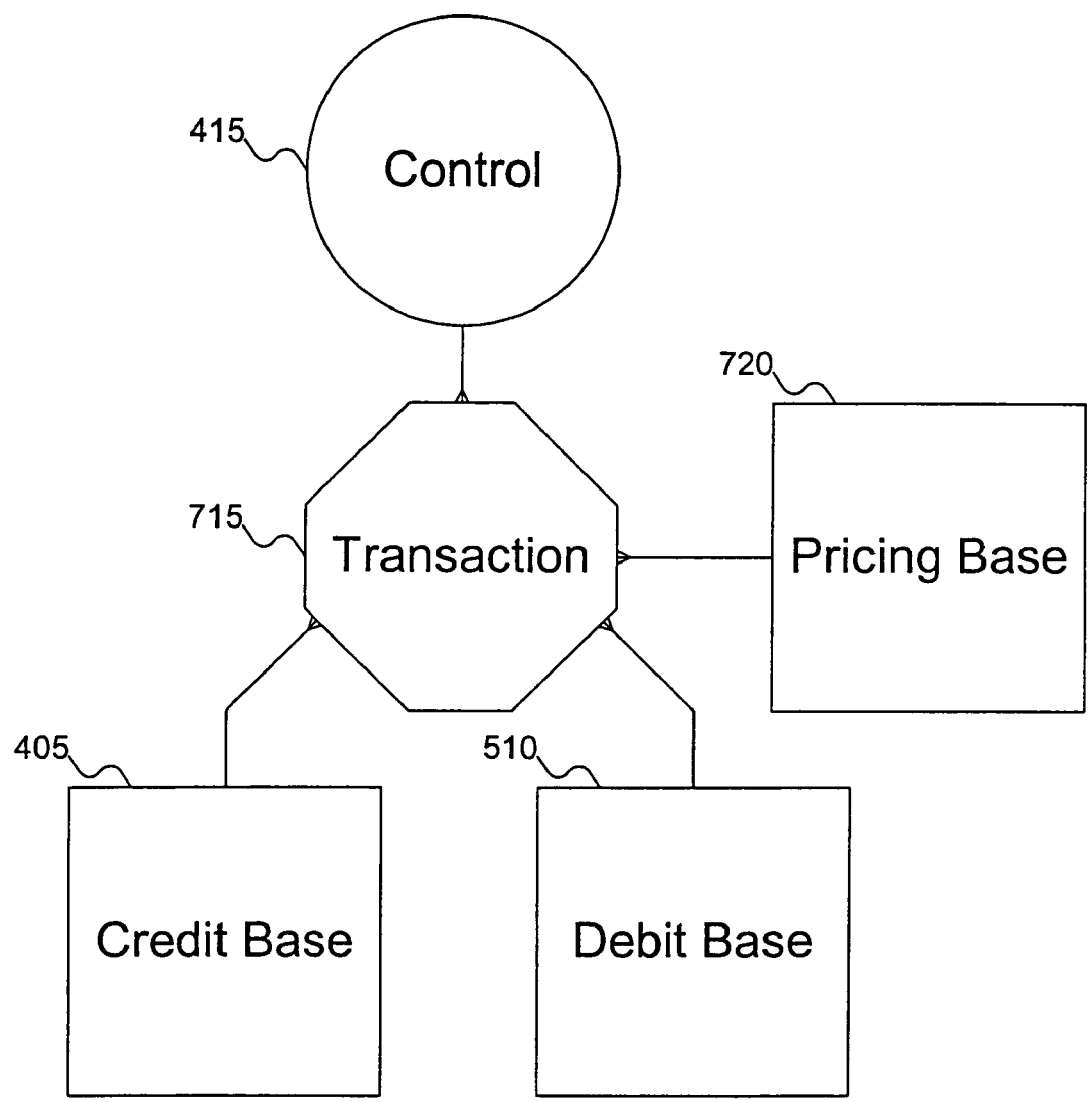
FIG. 7 shows a transaction controlled by a control according to the preferred embodiment of the invention, usable in the database in the computer system of FIG. 2.

FIG. 7 shows a transaction controlled by a control according to the preferred embodiment of the invention, usable in the database in the computer system of FIG. 2. In FIG. 7, transaction 715 is used to execute a transaction between base 405 and base 510. To execute transaction 715, credit base 405 supplies a resource (and is paid for it), and debit base 510 receives the resource (and pays for it). Pricing base 720 is used to determine the price debit base 510 pays the credit base 405 for the resource. For example, base 405 can describe an employee's work (i.e., time), and base 510 can describe the department that pays salaries. In exchange for time worked by the employee for the department, the department pays the employee a salary, thereby completing the transaction. Other types of transactions include issuing inventory and receiving money in payment of an invoice. Transaction 715 is controlled by control 415.

Note that, although money is used to price the transferred resource in the above examples, the transferred resource can be priced in units other than money. In addition, typically the transferred resource is independent from its valuation. Transactions follow the principles of dual entry accounting. Finally, transaction 715 does not revise any of credit base 415, debit base 510, or pricing base 720.

Figure 8:
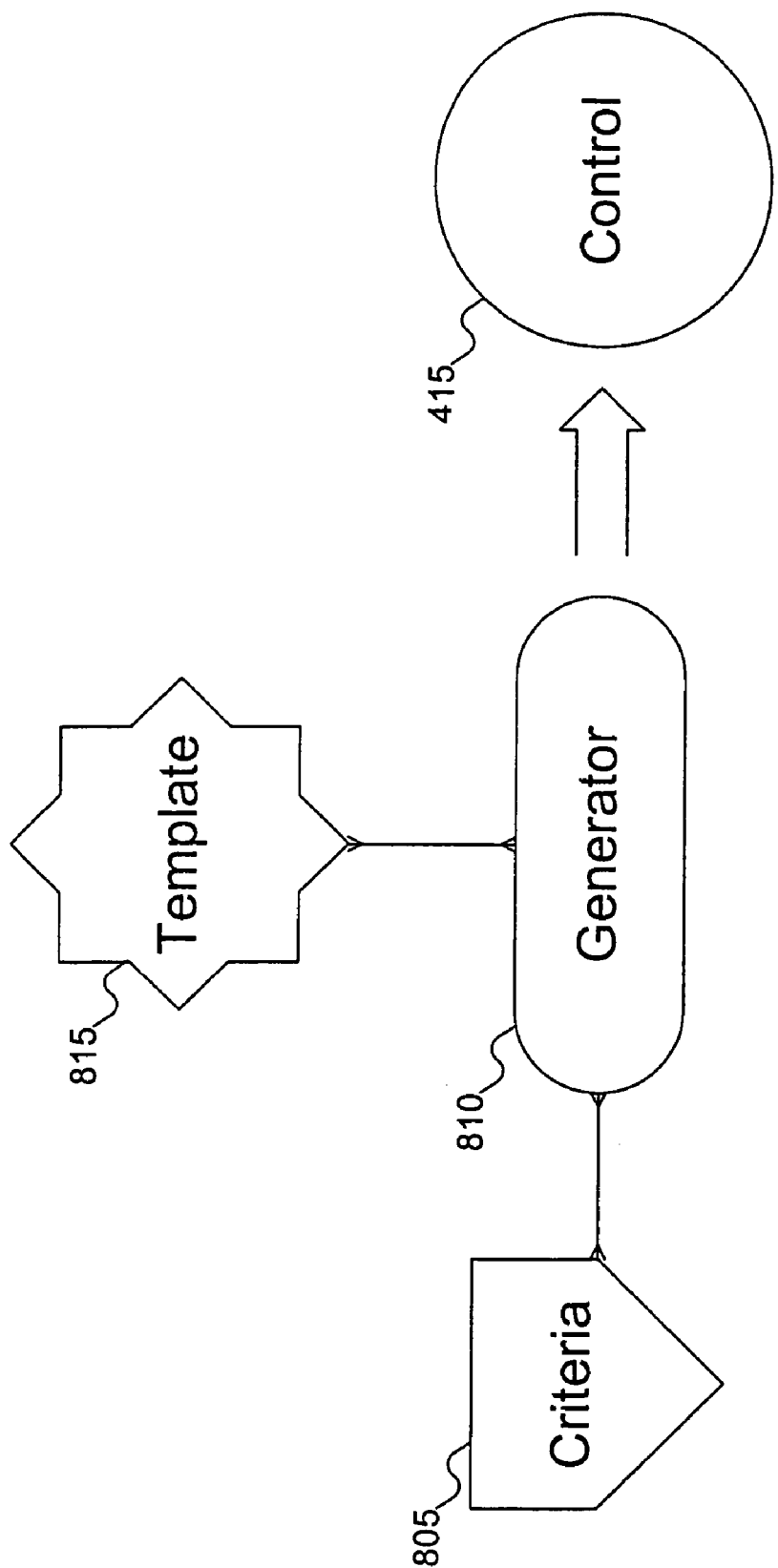
FIG. 8 shows a generator with criteria and template being used to start a control according to the preferred embodiment of the invention, usable in the database in the computer system of FIG. 2.

FIG. 8 shows a generator and template being used to start a control according to the preferred embodiment of the invention, usable in the database in the computer system of FIG. 2. Generators and templates can be used to automatically start controls to deal with situations that can arise without normal attention by humans. For example, consider a machine that requires lubrication. Although an employee is usually charged with checking that the machine has sufficient lubrication, such a task does not include determining if there is a problem to address.

But what if the machine is low on lubrication? Ordinarily, starting a control to add lubricant to the machine requires human involvement. But using a generator and a template, the control can be started automatically. Criteria 805 are typically drawn from an observation or a transaction. But a person skilled in the art will recognize that other archetypes can be used to feed criteria 805. Generator 810 evaluates criteria 805 to determine whether a control is needed. Then, if the evaluation indicates a control is needed, generator 810 produces starting data, adds it to a copy of template 815, which becomes a control 415. Note that generator 810 can have any number of criteria. In addition, although FIG. 8 shows template 815 with only one generator, template 815 can have many different generators, and generator 810 can use many templates 815 to start many controls 415.

Consider again the above example involving machine lubrication. Criteria 805 can be determined by measure the machine's lubrication. Generator 810 evaluates the criteria to determine whether the machine is low on lubricant. If the machine is low on lubricant, generator 810 produces starting data, such as which machine is low and how much lubricant to add to the machine, and passes the starting data to template 815. Template 815, in turn, starts control 415, which begins the process of adding lubricant to the machine. In contrast, if criteria 805 indicates the machine has sufficient lubricant, no control is needed. Criteria 805 then does not pass any data to generator 810.

Note also that criteria 805 can be generic, rather than specific to a base instance. Consider again the example of machines that require lubricant. If the machines were acquired at different times, their required levels of lubrication can differ. Criteria 805 should not use a fixed volume of lubricant as the determining factor to start a control, since a machine that has sufficient lubricant might be serviced unnecessarily, or worse, a machine with insufficient lubricant might go unserviced. Criteria 805 accesses data for each base instance to determine whether a control is needed for that base instance. This allows criteria 805 to operate generically for all base instances.

Figure 9:
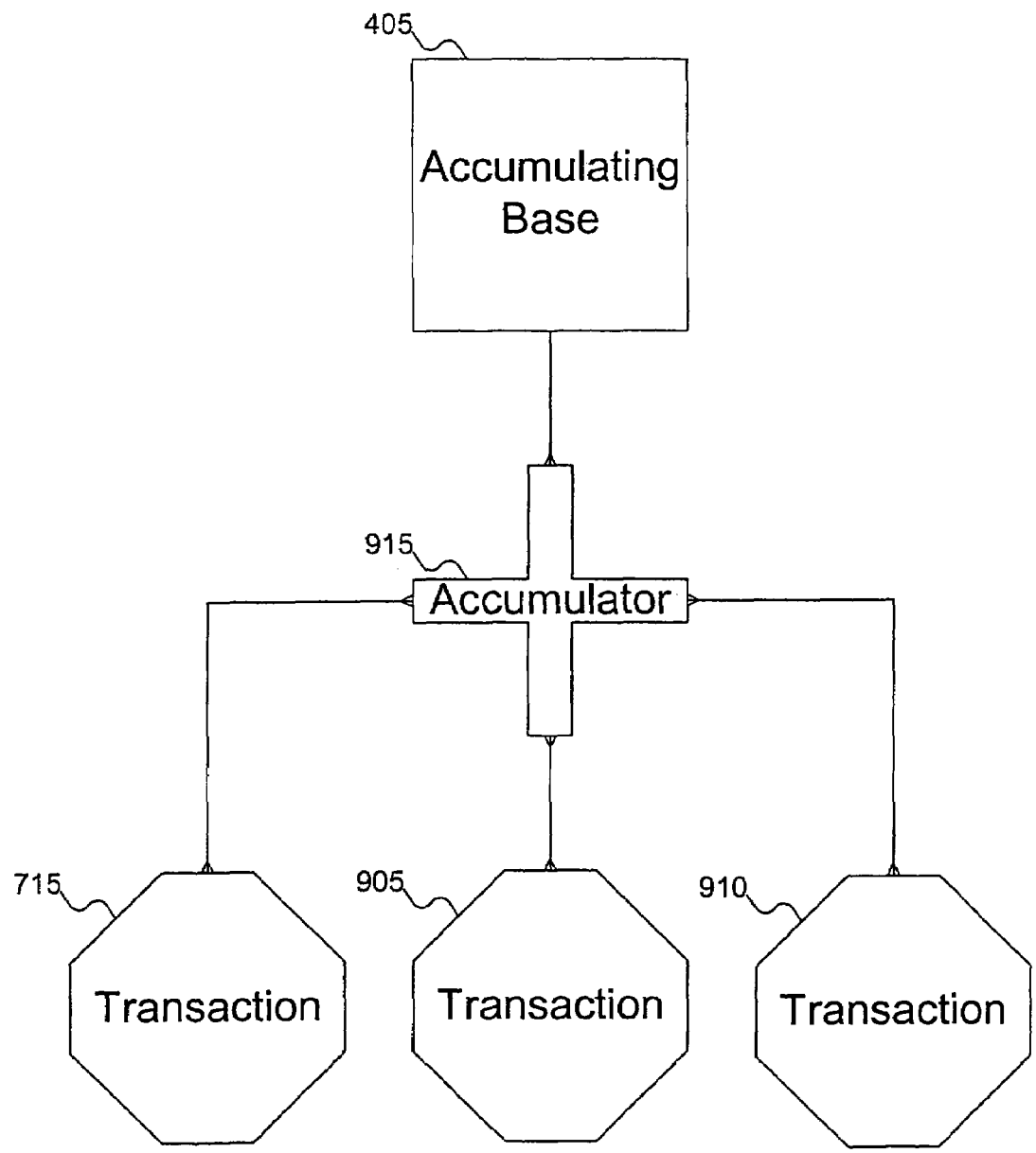
FIG. 9 shows an accumulator accumulating transactions for the base of FIG. 4 according to the preferred embodiment of the invention.

FIG. 9 shows an accumulator accumulating transactions on the instance of the base of FIG. 4 according to the preferred embodiment of the invention. Accumulator 915 is responsible for totaling transactions on a base. For example, as shown in FIG. 9, accumulator 915 totals transactions 715, 905, and 910. Although three transactions are shown in FIG. 9, a person skilled in the art will recognize that there can be any number of transactions totaled by accumulator 915. Which transactions are to be used by accumulator 915 are determined by accumulating base 405. Further, a transaction can be accumulated by any number of accumulators.

Now that the different archetypes have been discussed, an explanation of the distinction between archetype, type, and instance can be explained. Archetypes are used to classify data objects at the highest level of the process design. Types, on the other hand, represent models from which individual data objects can be created to store data. Instances represent logical occurrences of individual types. Finally, revisions are created for instances and actually store the data. It may help to consider the hierarchy from the bottom up: revisions store data, instances identify data objects, types define classes of instances with common themes, and archetypes define classes of types (a meta-type).

As an analogy to the hierarchy of archetype, type, instance, and revision, consider language. Linguists have determined that there are several families of languages, such as Indo-European, Sino-Tibetan, etc. Within each family of languages, there are individual languages, such as English and French within Indo-European, and Chinese and Japanese within Sino-Tibetan. Each language has different dialects, such as the Mandarin and Cantonese dialects of Chinese. Finally, dialects evolve over time, as new words are introduced and old words disappear from the dialect. The language family is analogous to the archetype, the language is analogous to the type, the dialect is analogous to the instance, and changes in the dialect are analogous to revisions.

Figure 10:
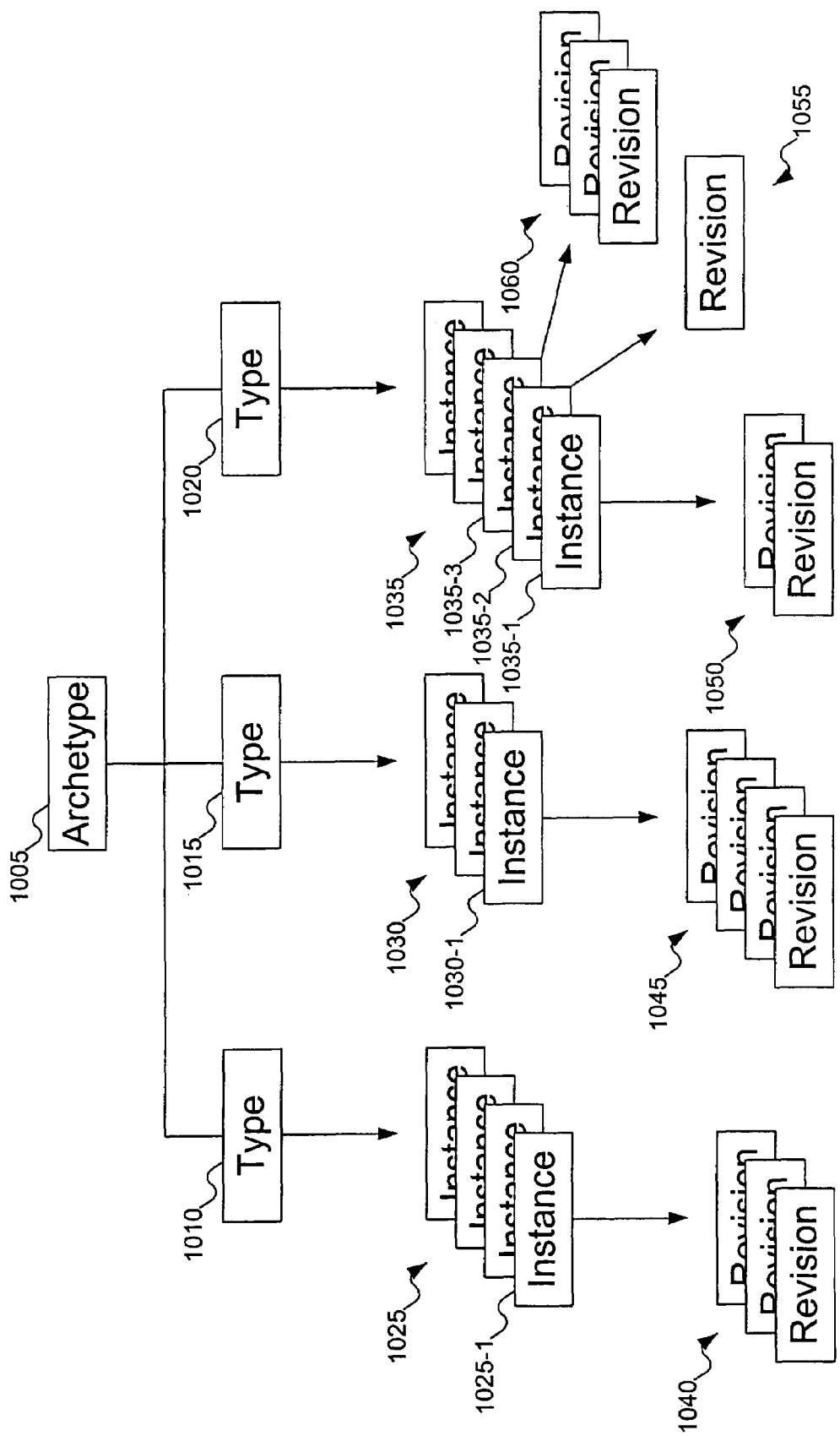
FIG. 10 shows the hierarchy of archetype, type, instance, and revision as used in the database in the computer system of FIG. 2.

FIG. 10 shows the hierarchy of archetype, type, instance, and revision as used in the database in the computer system of FIG. 2. For each archetype, such as archetype 1005, there can be multiple types 1010, 1015, and 1020. For each type, there can be multiple instances. Thus, in FIG. 10, type 1010 has four instances 1025, type 1015 has three instances 1030, and type 1020 has five instances 1035. For example, if archetype 1005 is a base, type 1010 can be a base type for employee data, type 1015 can be a base type for department data, and type 1020 can be a base type for facility data. Then, for employee data base type 1010, the four instances 1025 represent data objects for four employees. Within each instance, there can be multiple revisions. So, if instance 1025-1 represents information about a single employee, revisions 1040 describe the employee over time.

A person skilled in the art will recognize that the number of types created from each archetype, and the number of instances created from each base type, is limited only by the user's creativity and application needs. Thus, although three types 1010, 1015, and 1020 are shown in FIG. 10; there can be more or fewer types. Similarly, although only four instances 1025 are shown for base type 1010, there can be more or fewer instances.

Figure 11:
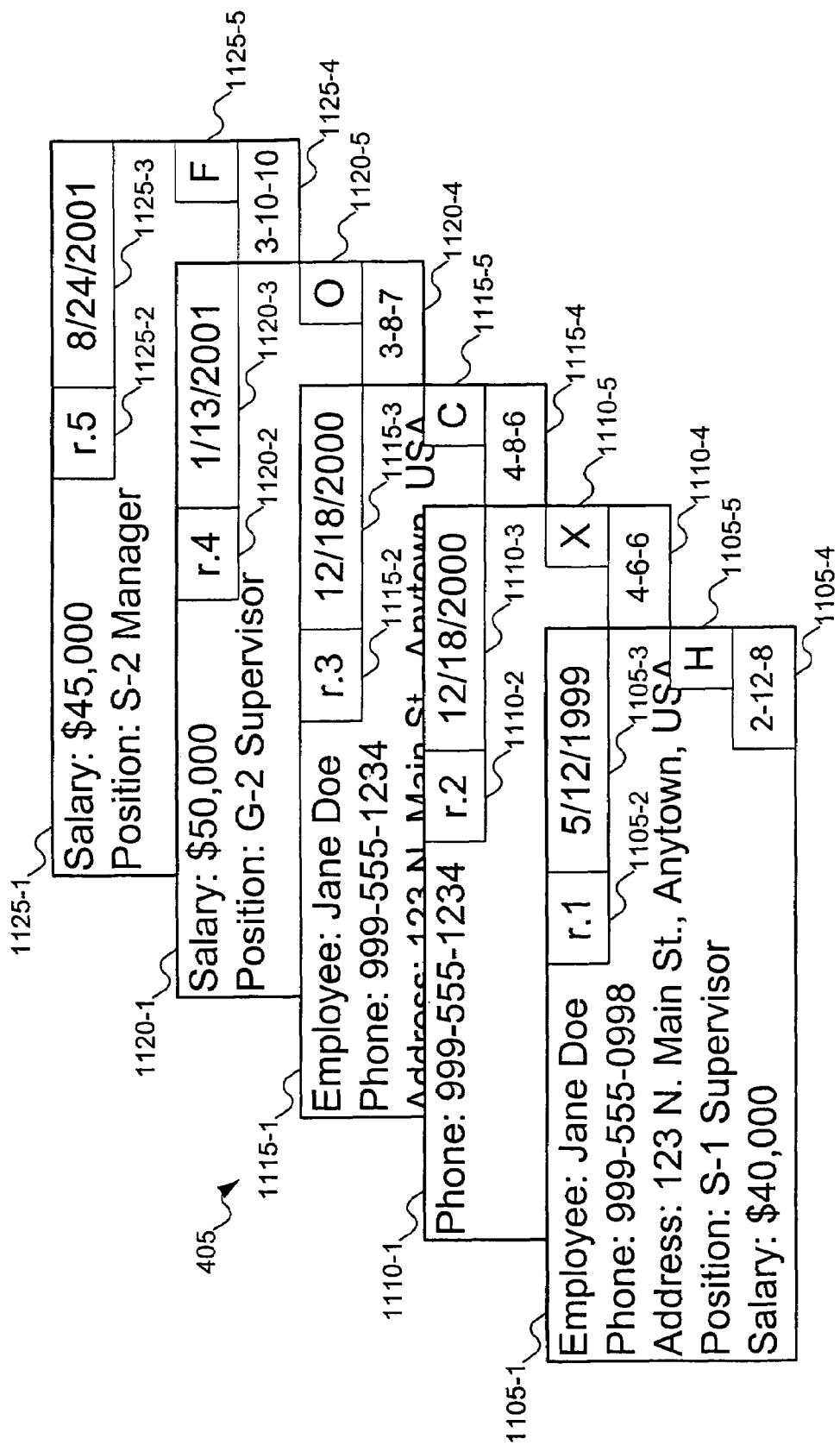
FIG. 11 shows the base of FIG. 4 with several revisions according to the preferred embodiment of the invention.

FIG. 11 shows the base of FIG. 4 with several revisions according to the preferred embodiment of the invention. In FIG. 11, base 405 includes four revisions 1105-1, 1110-1, 1115-1, and 1120-1. Revision 1105-1 was the first revision of the base (i.e., the first insertion of data into the base). Although base 405 includes employee data, a person skilled in the art will recognize that base 405 can store about any object in the process design. A person skilled in the art will also recognize that, although four revisions are shown, there can be more or fewer than four revisions in a base.

Aside from the basic employee data, revision 1105-1 includes fields such as revision number 1105-2, revision date 1105-3, revising control 1105-4, and status flag 1105-5. Revision number 1105-2 stores the number of the revision in the base: as can be seen, revisions are preferably numbered sequentially. Revision date 1105-3 stores the date that the revision occurred. Revision date 1105-3 does not actually need to be stored in revision record 1105-1, as the revision date can be determined from revising control 1105-4. Revising control 1105-4 identifies the control that added revision 1105 to base 405. Specifically, revising control 1105-4 identifies the revising control by type, instance, and revision number. This enables a user to quickly track down what step in what process created the revision of base 405. Controls and revisions of controls are discussed further with reference to FIGS. 14-15 below. Finally, status flag 1105-5 marks the status of the revision.

There are five different states a revision can be in, and all five are shown in FIG. 11. "Historic" revisions are represented with a status flag of "H," shown for revision 1105-1. "Current" revisions are represented with a status flag of "C," shown for revision 1115-1. "Future" revisions are represented with a status flag of "F," shown for revision 1125-1. "Control" revisions are represented with a status flag of "X," shown for revision 1110-1. And "Obsolete" revisions are represented with a status flag of "O," shown for revision 1120-1.

The meanings of status flags "H" and "C" are fairly intuitive: "historic" revisions are revisions that were current in the past but are no longer current, and "current" revisions are revisions storing data that are currently accurate. Note that there should only be one "current" revision at any time. Even when a control has terminated (whether normally or abnormally), there is a "current" revision of the control. There are no further "future" revisions of the control (since the control is complete), which means that the "current" revision of the control representing the complete status is never changed.

But the other status flags are less intuitive. "Future" revisions reflect revisions that might become current, if the process changing the data in the base completes normally. "Future" revisions can occur in many ways. One way a "future" revision can occur when a control is working on, but has not completed, updating a base. Consider, for example, a control that promotes an employee. Before the promotion can occur, various managers, such as the department supervisor and department manager, must approve the promotion. Typically, promotions are not denied, since an employee not deserving of a promotion typically will not be put up for promotion. Thus, a "future" revision can be added to the base specifying the promotion, but not yet made current until the promotion is completely approved.

"Control" revisions are "future" revisions that have been succeeded by further "future" revisions under the same control. Again, consider a department supervisor who wants to promote an employee. The process of promoting an employee is managed by a control, which creates a "future" revision of the employee's base. When the department manager approves the promotion, he may suggest a new salary. A new "future" revision is then created in the employee's base to reflect the data at the time the promotion was approved, including the new salary. The earlier "future" revision, reflecting only the department supervisor's suggested salary, has been updated, so it should no longer be considered a "future" revision. Neither should the earlier "future" revision become a "current" revision, since the promotion process is not complete. It should not be deleted, since it is part of the employee's history. Marking the earlier "future" revision as "historic" would be confusing, since before a revision changed to a "historic" revision, it has to be "current." The solution is to change the earlier "future" revision to a "control" revision. This indicates that the revision was once a "future" revision that has been superseded by a later "future" revision and is only there for the purpose of the control.

"Obsolete" revisions are "future" revisions managed by a control that has terminated abnormally. When a control reaches a completed status, the base (or other archetype) managed by the control is checked to make sure that there are no remaining "future" revisions that were created by the control. If the control has completed but left "future" revisions in the base, these "future" revisions will not be changed to "control" or "current" revisions. It is at this time that these "future" revisions are changed to "obsolete" revisions.

Consider again the department supervisor who wants to promote an employee. But if the department manager vetoes the idea of a promotion, the process terminates abnormally. The "future" revision created by the control should not be deleted, since it is part of the history of the employee, but neither should it be left flagged as a "future" revision, since then it might conflict with other "future" revisions (see with reference to FIGS. 13A and 13B below). By changing the revision to "obsolete," it becomes clear that the revision was part of a process that terminated abnormally and did not become either "current" or "historic."

Figure 12:
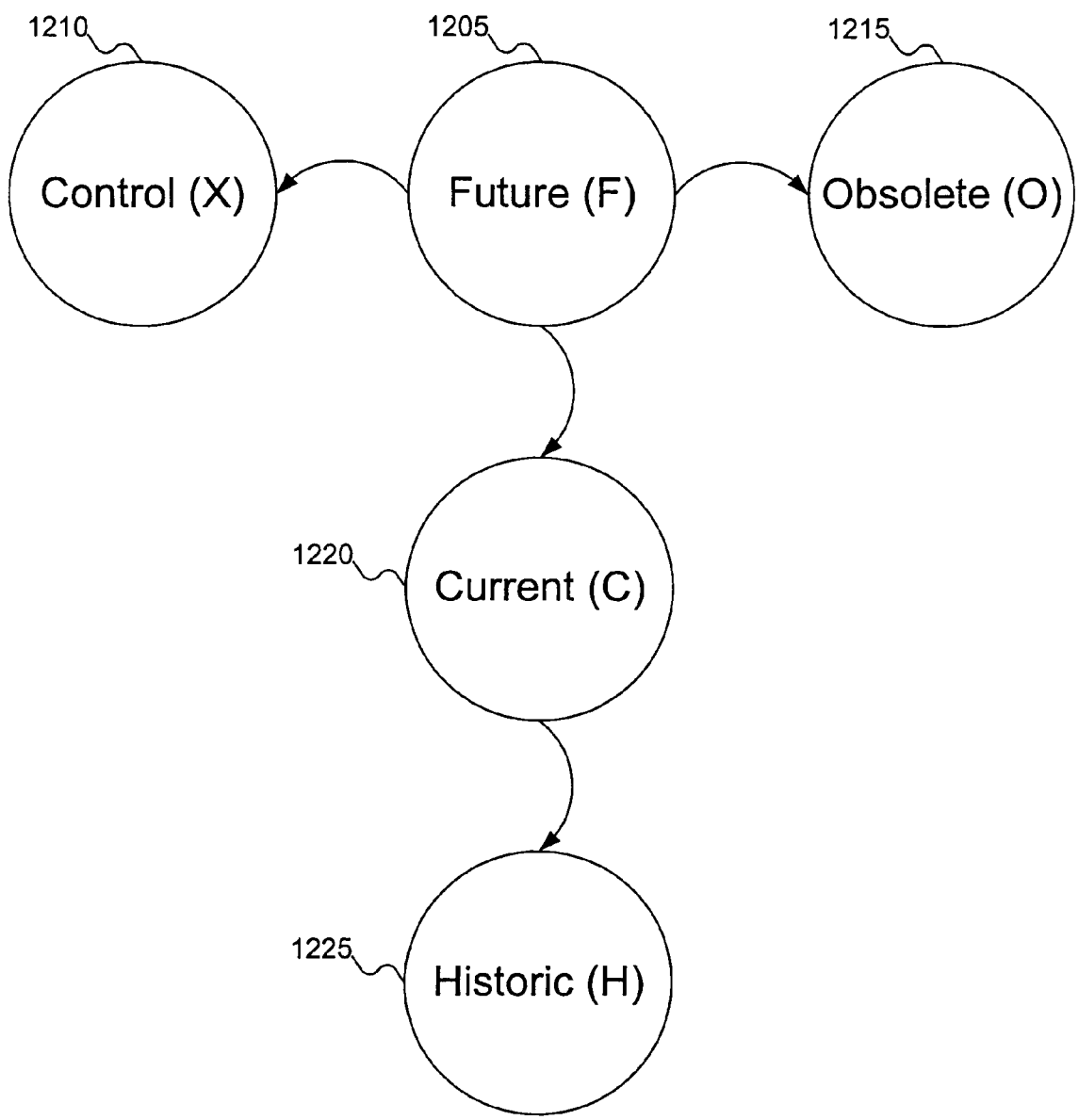
FIG. 12 shows a state diagram for status flags in the revisions of FIG. 11.

FIG. 12 shows a state diagram for status flags in the revisions of FIG. 11. In FIG. 12, revisions are first marked as "future" revisions, as shown in state 1205. "Future" revisions can change to "control" revisions (state 1210) as the revising control updates the "future" revision while proceeding normally, or "obsolete" revisions (state 1215) if the revising control ends abnormally. When the revising control indicates it is time to make the "future" revision current, a "future" revision is changed to "current" (state 1220), which eventually becomes "historic" (state 1225). When a later "future" revision becomes "current."

Returning to FIG. 11, revisions 1110-1, 1115-1, 1120-1, and 1125-1 update initial revision 1105-1 of base 405. In the preferred embodiment, revisions that are not "current," such as revisions 1110-1, 1120-1, and 1125-1, only store the fields within base 405 that have changed relative to the previous revision. By storing only the changed fields, base 405 uses less space in the database. "Current" revisions, such as "current" revision 1115-1, store a complete copy of the data in the base as it currently exists, including data that might not have changed from the previous "historic" revision. This enables access to the current data by looking at only a single revision. But a person skilled in the art will recognize that the current data can be determined by starting with the first "historic" revision of the base and applying the changes sequentially. Note that each revision includes a sequential revision number 1105-2, 1110-2, 1115-2, 1120-2, and 1125-2.

Before revisions are changed to "current," they are tested to make sure the data are consistent and valid. For example, a particular position with the company entails a salary within a pre-defined range, if the salary is out-of-range for the position, the data are inconsistent. Similarly, an employee cannot have a negative salary: such a value is invalid. But these limitations do not apply to "future" revisions. "Future" revision revisions can be inconsistent or have invalid data, as long as the inconsistencies and invalid values are resolved before the "future" revision is changed to a "current" revision. Consider "future" revision 1125-1. The company might specify that a S-2 manager have a salary between $50,000 and $60,000. If "future" revision 1125-1 were changed to a "current" revision, the data would be inconsistent, since the employee's salary is currently only $45,000. But until "future" revision 1125-1 is changed to a "current" revision, this inconsistency does not need to be resolved.

When the control managing a process operating on a base indicates it is time to update a base (typically, base updates are finalized when the control terminates, but this is not required), the "current" revision is changed to "historic" and a "future" revision is changed to the "current" revision. It is when a revision is going to be changed to "current" revision that the revision is tested to make sure the data are consistent and valid. Any inconsistent or invalid data are then flagged for correction.

FIG. 11 shows only one of each type of revision. For example, FIG. 11 only shows a single "future" revision 1125-1. A person skilled in the art will recognize that there can be multiple revisions of each type (except for "current" revisions) at the same time. Multiple "historic" revisions reflect all the changes that happened in the past to a base, whereas multiple "future" revisions reflect changes that could be made in the future to a base. For example, a human resources employee might be updating an employee's personal information, while at the same time a manager is processing the employee's promotion.

Where there are multiple "future" revisions, certain additional rules apply. Where the multiple "future" revisions update different fields, there are no problems. But where multiple "future" revisions update the same fields, a conflict can occur. Consider the situation in which two controls simultaneously update, say, an employee's salary. Because neither "future" revision is yet current, neither person sees the other's update. If both "future" revisions eventually become current, one "future" revision can end up making a revision that ignores the other "future" revision. For this reason, all "future" revisions updating the same field have to agree on the same future value of the field. If the "future" revisions disagree on the value, the conflict needs to be resolved before either control is advanced to the next status (revision).

Figure 13A:
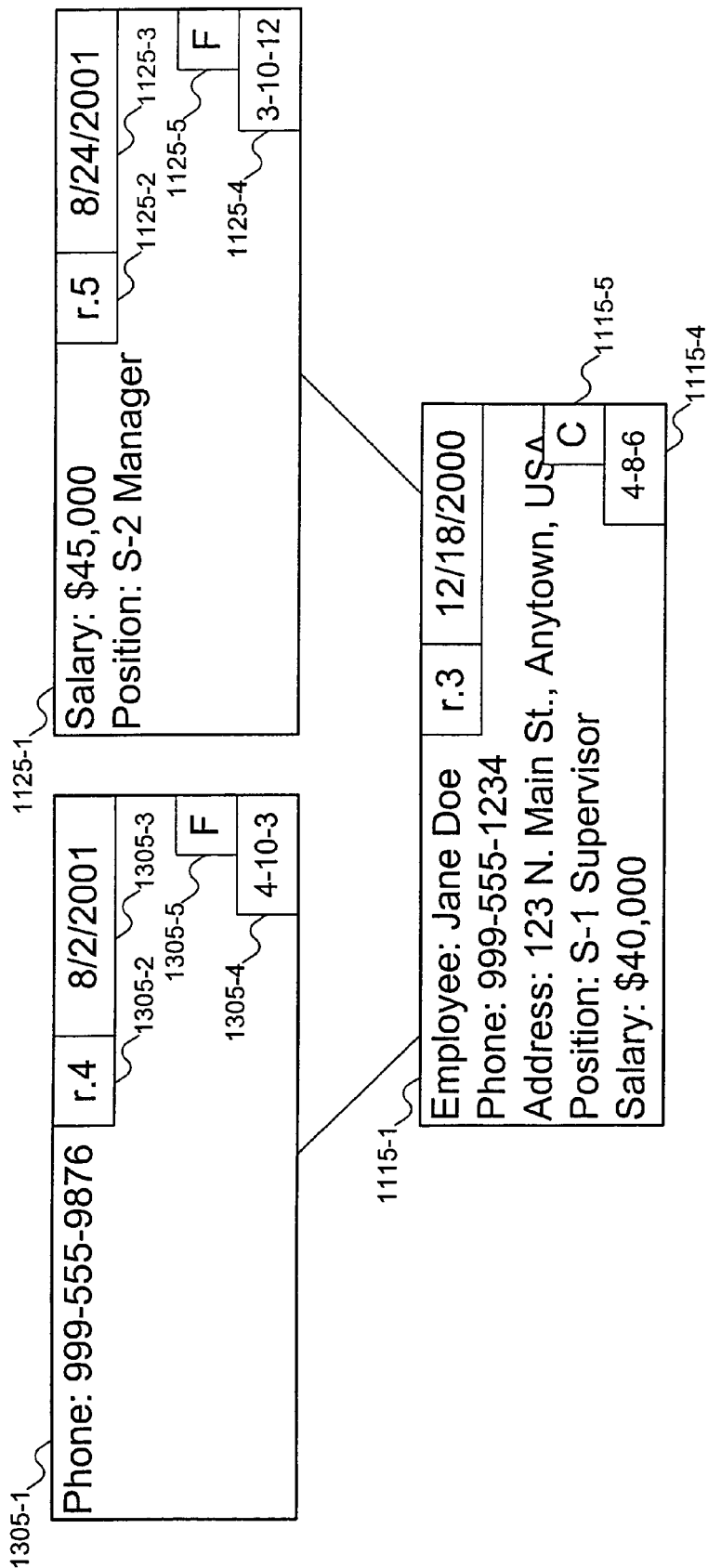
FIGS. 13A and 13B show acceptable and unacceptable multiple "future" revisions of the base of FIG. 4 according to the preferred embodiment of the invention.
Figure 13B:
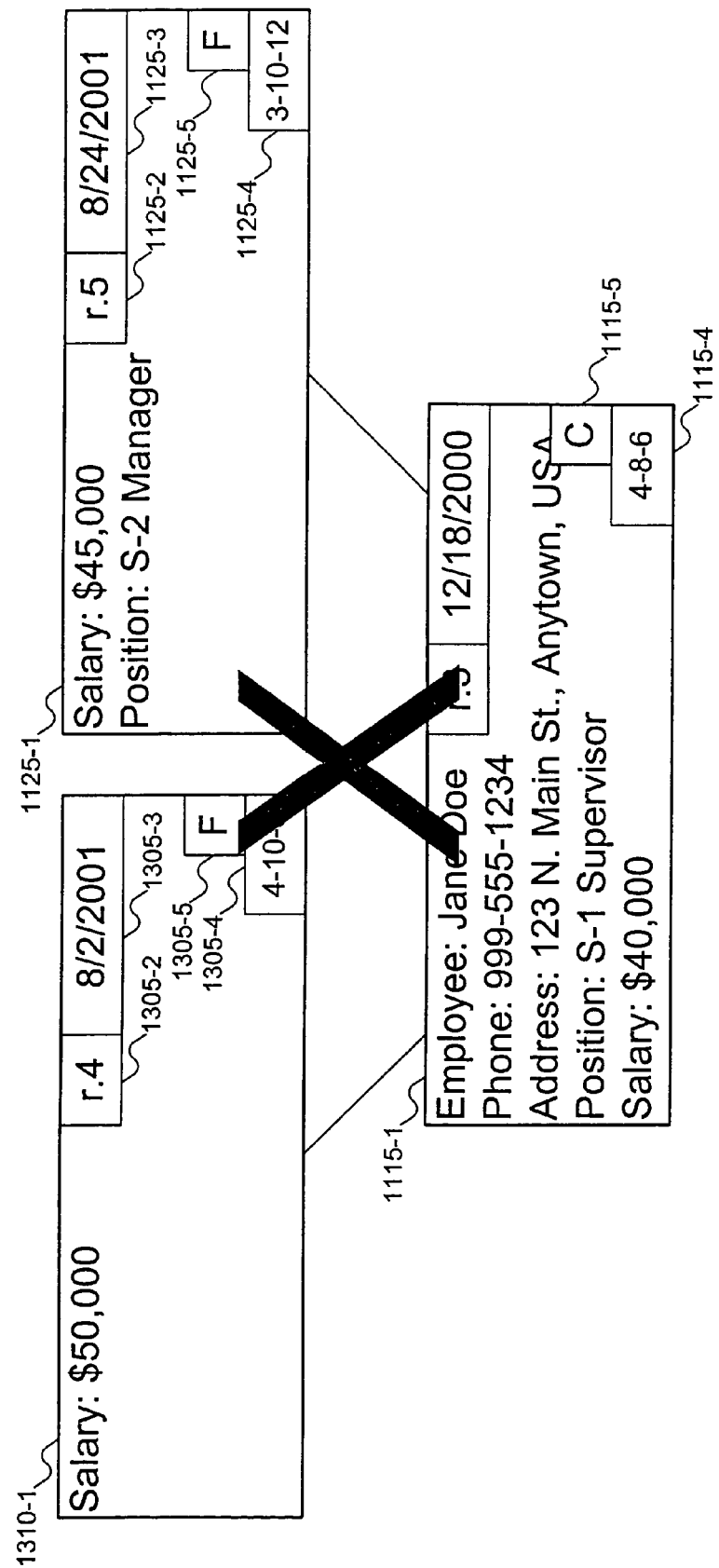

FIGS. 13A and 13B show acceptable and unacceptable multiple "future" revisions of the base of FIG. 4 according to the preferred embodiment of the invention. In FIG. 13A, revision 1115-1 is the "current" revision of the base. Two "future" revisions 1125-1 and 1305-1 are shown: "future" revision 1305-1 updating the employee's phone number and "future" revision 1125-1 giving the employee a new position and new salary. Because there is no conflict between the fields of "future" revisions 1305-1 and 1125-1, both "future" revisions can be processed.

In contrast, in FIG. 13B, "future" revision 1310-1 and "future" revision 1125-1 both revise the salary field, and to different values. This creates a conflict, and until the conflict is resolved (either by one of the "future" revisions not revising the salary field or by "future" revisions 1310-1 and 1125-1 agreeing on a common value for the salary field), neither control can advance to the next status.

Figure 14:
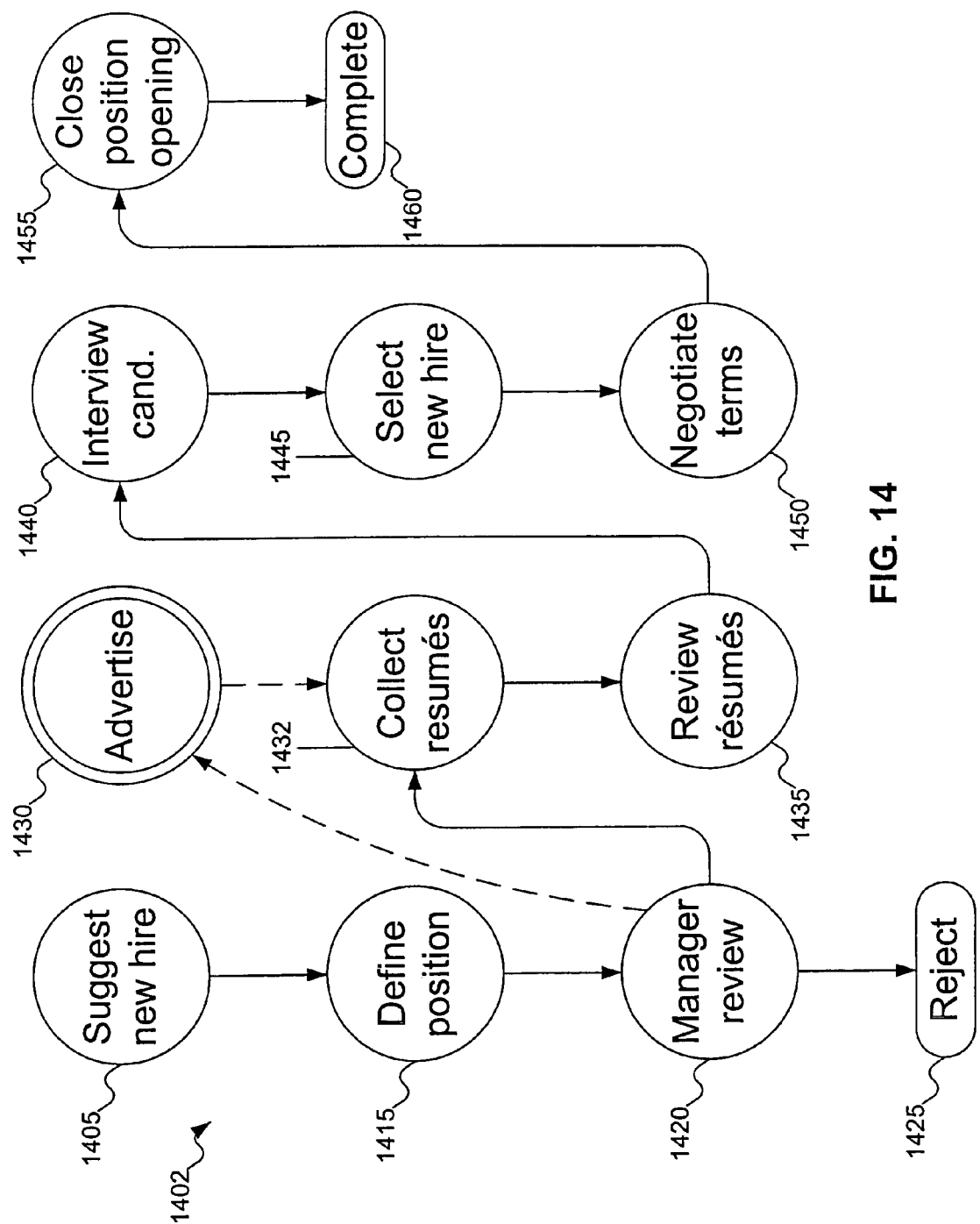
FIG. 14 shows an example of the steps of the control of FIG. 4 according to the preferred embodiment of the invention.

FIG. 14 shows an example of the steps of the control of FIG. 4 according to the preferred embodiment of the invention. In FIG. 14, control 1402, a sample process for hiring a new employee, is shown. At step 1405, a supervisor suggests that a new employee be hired. At step 1415, the position for the new employee is defined. At step 1420, a manager reviews the proposal. Assuming the manager does not reject the proposal at step 1425, at "step" 1430, the new position is advertised. At step 1432, resumes of persons interested in the position are collected. At step 1435, the resumes are reviewed to find candidates for the position. At step 1440, candidates are interviewed. At step 1445, one candidate is selected. At step 1450, the terms of employment are negotiated with the selected candidate, and at step 1455 the position opening is closed.

Most persons skilled in the art will recognize that, although control 1402 shows the process as sequential, it is in fact an iterative process. That is, at any point in control 1402, the process can be sent back to an earlier step for any number of reasons. For example, the manager reviewing the position definition in step 1420 can return the position definition to step 1415 for refinement. Similarly, if the candidate employee in step 1450 demands employment terms that the company is unwilling to provide, the process can return to step 1445 and select a new candidate, or even send the process back to manager review at step 1420, who could then reject the idea of hiring a new employee at step 1425.

Note that "step" 1430, the step of advertising, is marked with a double circle. This represents that advertising is handled by a separate control, responsible for locating the right places to advertise, paying for the advertisements, etc. The advertising control is not actually a step in the control of FIG. 14 (hence the quotation marks around the term), which is why dashed lines are used to include advertising "step" 1430 in control 1402, and is why there is a direct line from manager review step 1420 to resume collection step 1432. But resume collection step 1432 cannot begin until advertising "step" 1432 is complete. This shows that one control can be responsible for inserting a data value into another control.

Figure 15:
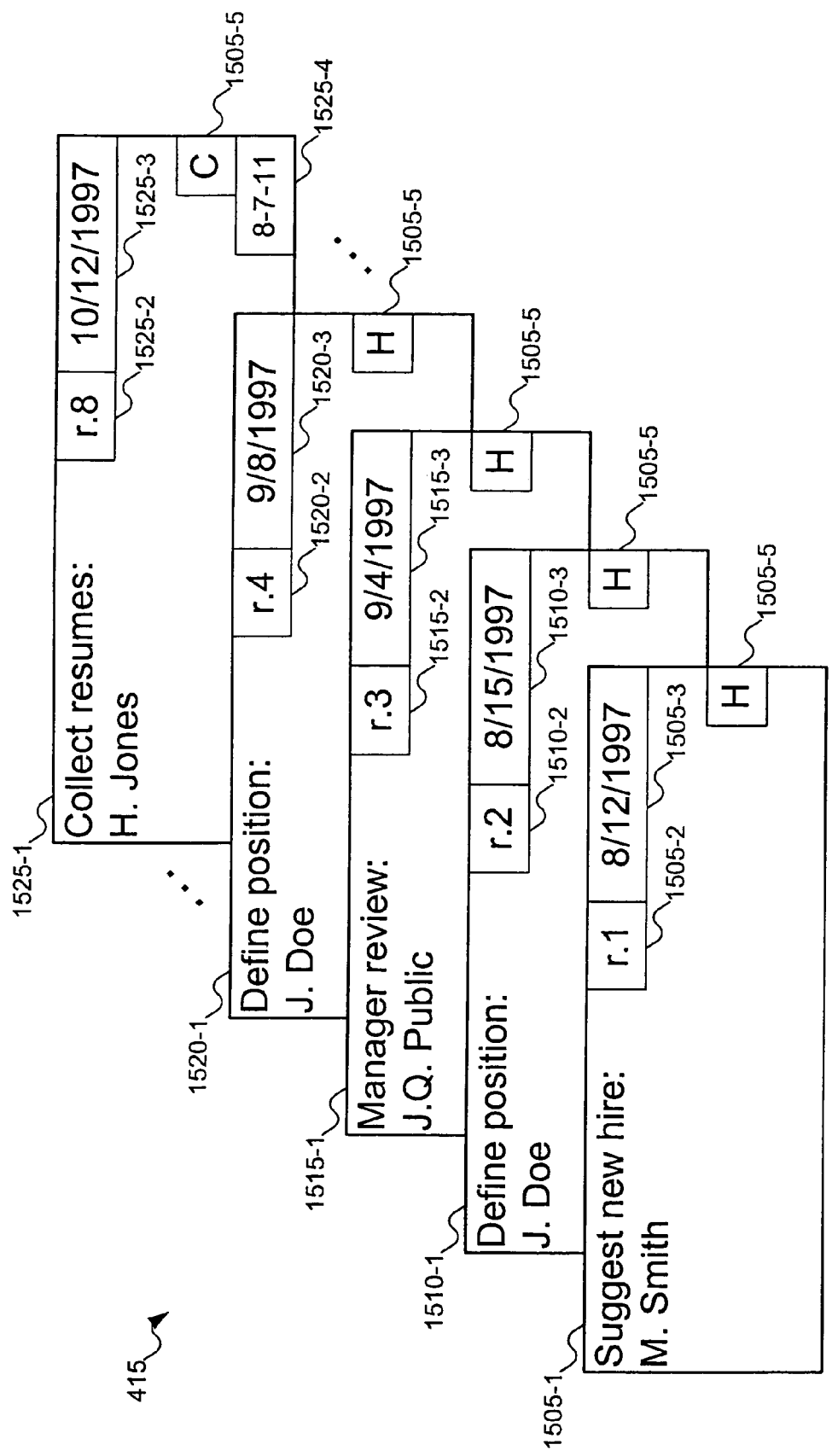
FIG. 15 shows revisions of the control of FIG. 14 according to the preferred embodiment of the invention.

FIG. 15 shows revisions of the control of FIG. 14 according to the preferred embodiment of the invention. In FIG. 15, the revisions of control 415 show the supervisors/managers/etc. responsible for handling of each step. The structure of control revisions 1505-1, 1510-1, 1515-1, 1520-1 and 1525-1 are similar to the revisions of base 405 in FIG. 11 in that the control revisions store data, have revision numbers, and track the dates on which the steps were handled, although there are some differences. First, the primary function of control revisions 1505-1, 1510-1, 1515-1, 1520-1 and 1525-1 are to store the authority that handled each step, although a person skilled in the art will recognize that control revisions 1505-1, 1510-1, 1515-1, 1520-1 and 1525-1 can store additional data.

Figure 16:
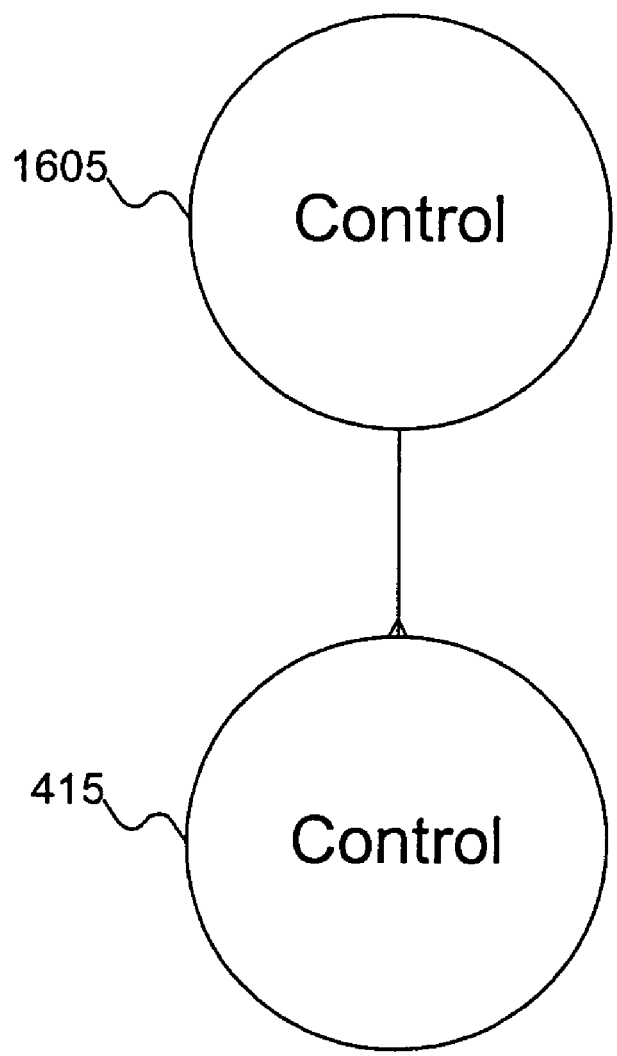
FIG. 16 shows a control controlled by a second control according to the preferred embodiment of the invention, usable in the database in the computer system of FIG. 2.

Second, in general, control revisions do not include references to revising controls. But where one control modifies another, as in FIG. 16, the revising control is referenced in the revised control, as shown in control revision 1525-1, which references revising control 1525-4. In FIG. 16, one control is controlled by a second control. For example, it can happen that a schedule applying to one control needs to be revised (e.g., a date needs to be moved). But because the date is sensitive, changing the date requires agreement (i.e., authorization) by managers. Only when there is agreement can the date be revised. FIG. 16 shows that one control, such as control 1605, can manage another control, such as control 415.

Returning to FIG. 15, note also that control revisions can have any of the different status flags discussed above with reference to FIG. 11. "Historic" and "current" revisions make immediate sense in the context of controls revising bases. "Control," "future," and "obsolete" revisions can occur where one control modifies another.

Figure 17:
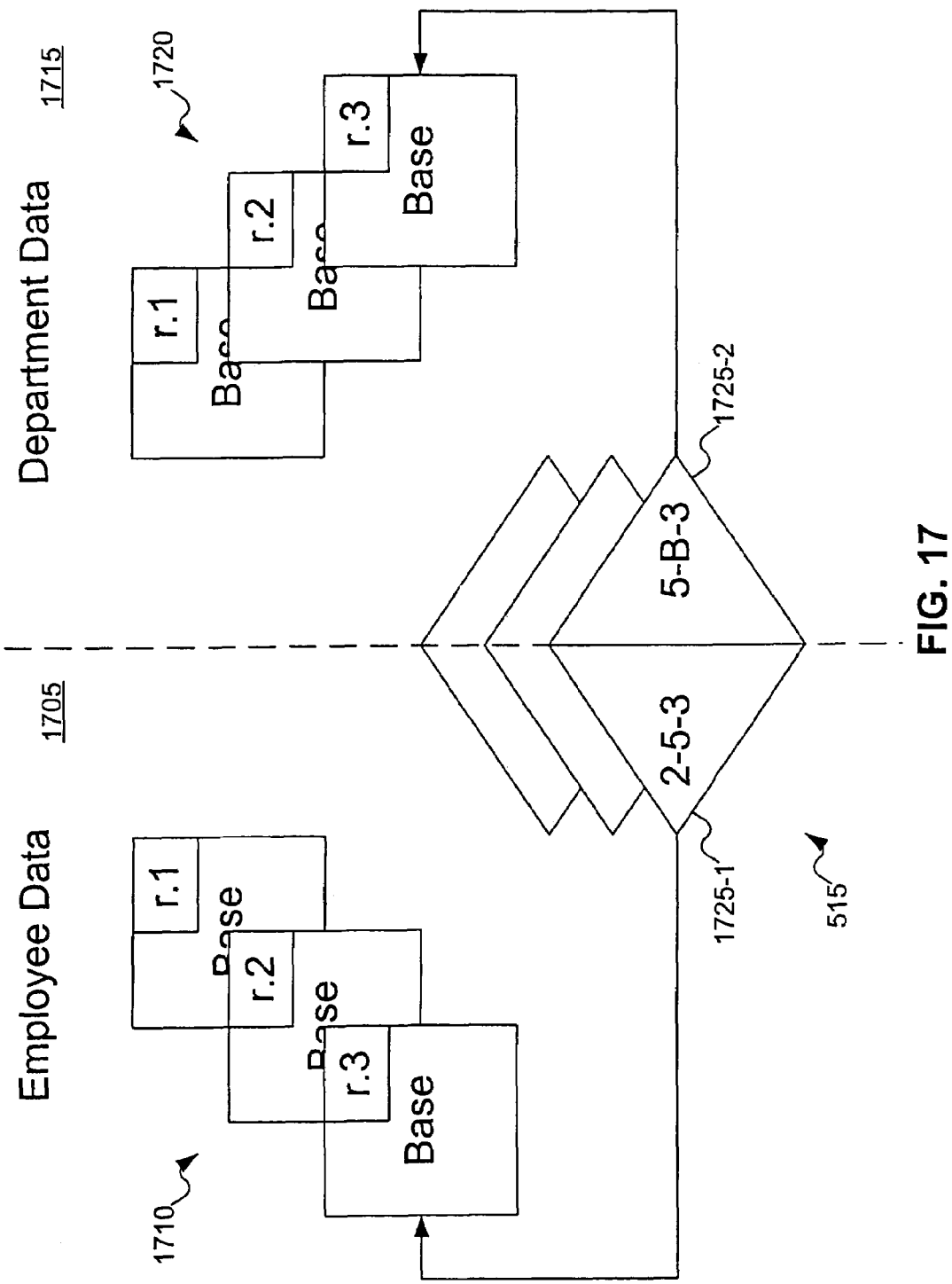
FIG. 17 shows the intersection of FIG. 5 correlating data between two bases, according to the preferred embodiment of the invention.

FIG. 17 shows the intersection of FIG. 5 correlating data between instances of two bases, according to the preferred embodiment of the invention. A basic concept of the invention is that different types of data are kept separate. Thus, employee data 1705 do not store which department individual employees work for, and department data 1715 do not store which employees work in each department. As shown in FIG. 17, employee data 1705 and department data 1715 can be thought of as disparate types of data.

As described above with reference to FIG. 5, intersections are used to correlate data from two bases. Thus, to store which employees work for which department and vice versa, intersections are used. FIG. 17 shows multiple intersections used to correlate employee data 1705 with department data 1715. Base 1710 shows the revisions associated with a single employee within employee data 1705. Base 1720 shows the revisions associated with a single department within department data 1715. (Although FIG. 17 only shows one base within employee data 1705 and one base within department data 1715, a person skilled in the art will recognize that there can be many bases for each type of data, and that the numbers of bases of each type of data do not have to agree.) Intersection 515 includes employee reference 1725-1 identifying revision three of base 1710 (for Employee 5) and department reference 1725-2 identifying revision three of base 1720 (for Department B).

The references 1725-1 and 1725-2 are stored as triples. As with base revisions, the triples identify the type, instance, and revision of the base identified. (As with base revisions, only one archetype can be intended, and so the archetype ID does not need to be included.) Thus, for example, reference 1725-1 references the third base revision of the instance for Employee 5 within base type 2 (base type 2 signifying employee data 1705).

Figure 18:
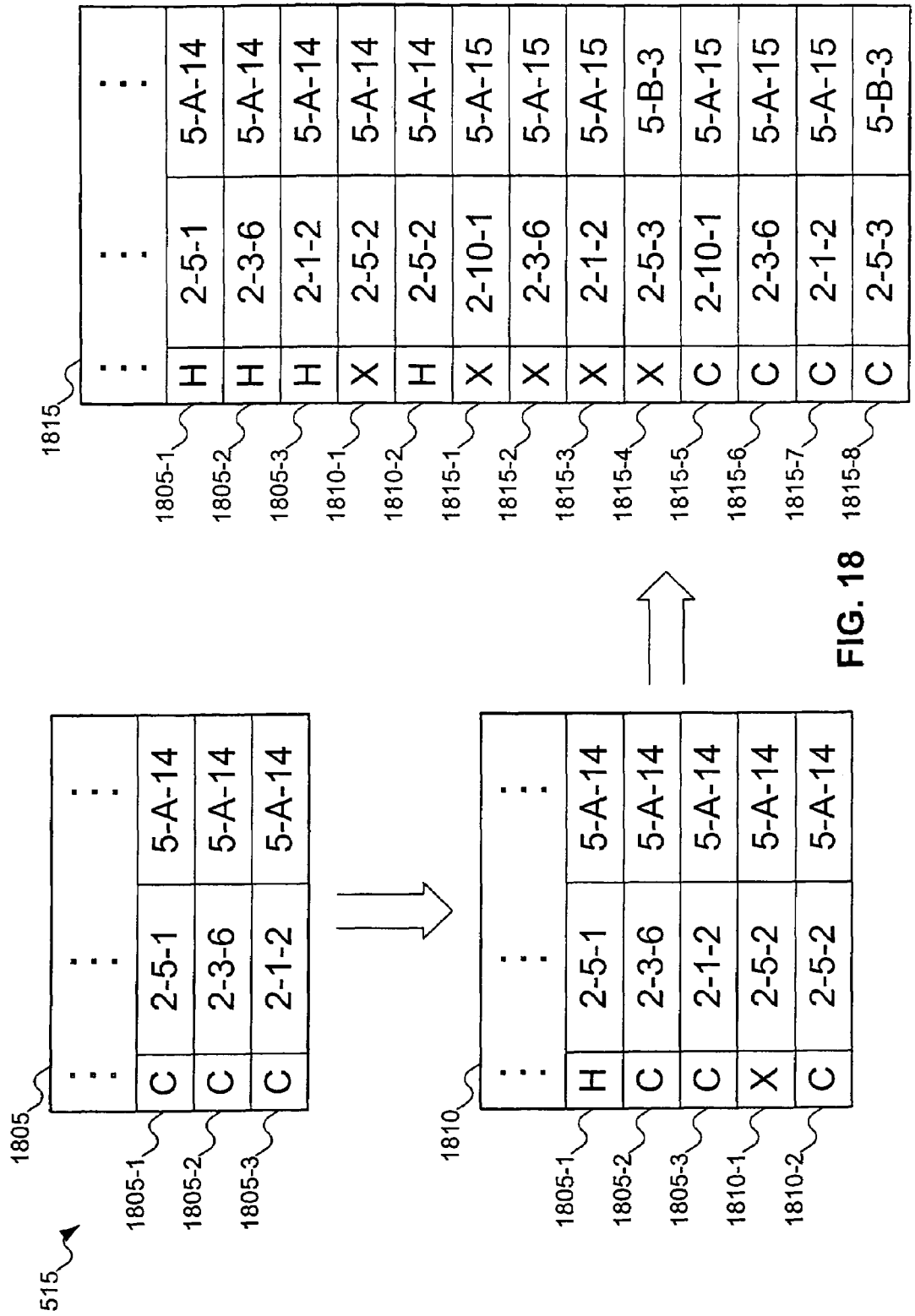
FIG. 18 shows revisions of the intersection of FIG. 17 according to the preferred embodiment of the invention.

Like bases and controls, intersections can have revisions. FIG. 18 shows revisions of the intersection of FIG. 17 according to the preferred embodiment of the invention. (FIG. 18 is shown using tables rather than the "card catalog" format used in FIGS. 11 and 15 because of the amount of information to be shown.) In FIG. 18, intersection 515 is shown correlating employees with departments. Table 1805 shows intersection 515 before any changes are made. As indicated by records 1805-1, 1805-2, and 1805-3, respectively, Department A employs Employees 5, 3, and 1. The "C"s in the first column of table 1805 indicate that records 1805-1, 1805-2, and 1805-3 are "current."

There are two ways intersections can be updated. First, one of the bases correlated by the intersection can be updated. When this happens, the intersection is automatically updated to reflect the new revision record in the modified base. For example, assume that Employee moves to a new address. In table 1810, Employee 5's base has been updated. The control for intersection 515 creates a "future" revision (not shown in table 1810) of the intersection record reflecting the new "current" revision of Employee 5's base. When the control finishes updating intersection 515, this intersection revision is changed to a "control" revision (entry 1810-1). Old intersection record 1805-1 is changed to "historic," and new "current" intersection record 1810-2 is added to table 1810.

But note that there are times when intersections should not be automatically updated when a correlated base is revised. For example, consider a configuration management system, wherein a piece of equipment meets a current specification. The correlation of equipment with specification is represented with an intersection. But if the specification is updated, the equipment is not necessarily updated to meet the new specification. The intersection should continue to correlate the equipment with the older specification, The second way intersections can be updated is when the relationships between the bases change. When this happens, all "current" revisions are changed to "historic," to make way for new "current" revisions reflecting the new relationships. For example, assume that Employee 5 transfers to Department B and Employee 10 is added to Department A to replace the departing Employee 5. In table 1815, Employee 10's base has been created. The control for intersection 515 is then used to reflect the new alignment of employees. "Future" revisions (not shown in table 1815) are created for each relationship between employee and department. These "future" revisions are changed to "control" revisions once all the relationships are properly created (entries 1815-1, 1815-2, 1815-3, and 1815-4). Finally, new revisions are created and changed to "current" (entries 1815-5, 1815-6, 1815-7, and 1815-8).

Although FIGS. 17-18 show intersections correlating information between bases, a person skilled in the art will recognize that intersections can correlate information between other archetypes. For example, an intersection can correlate information between two controls.

Figure 19:
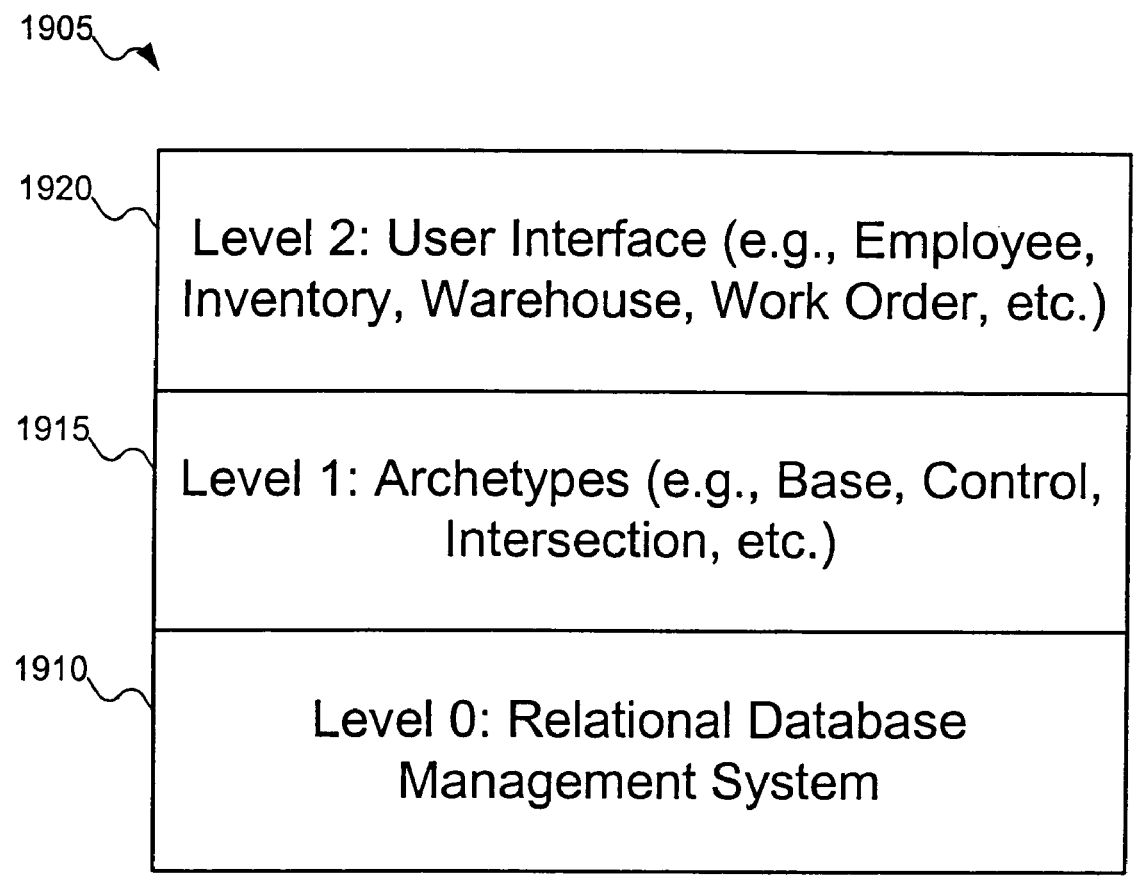
FIG. 19 shows the organization of data concepts of the database of the computer system of FIG. 2.
Figure 20A:
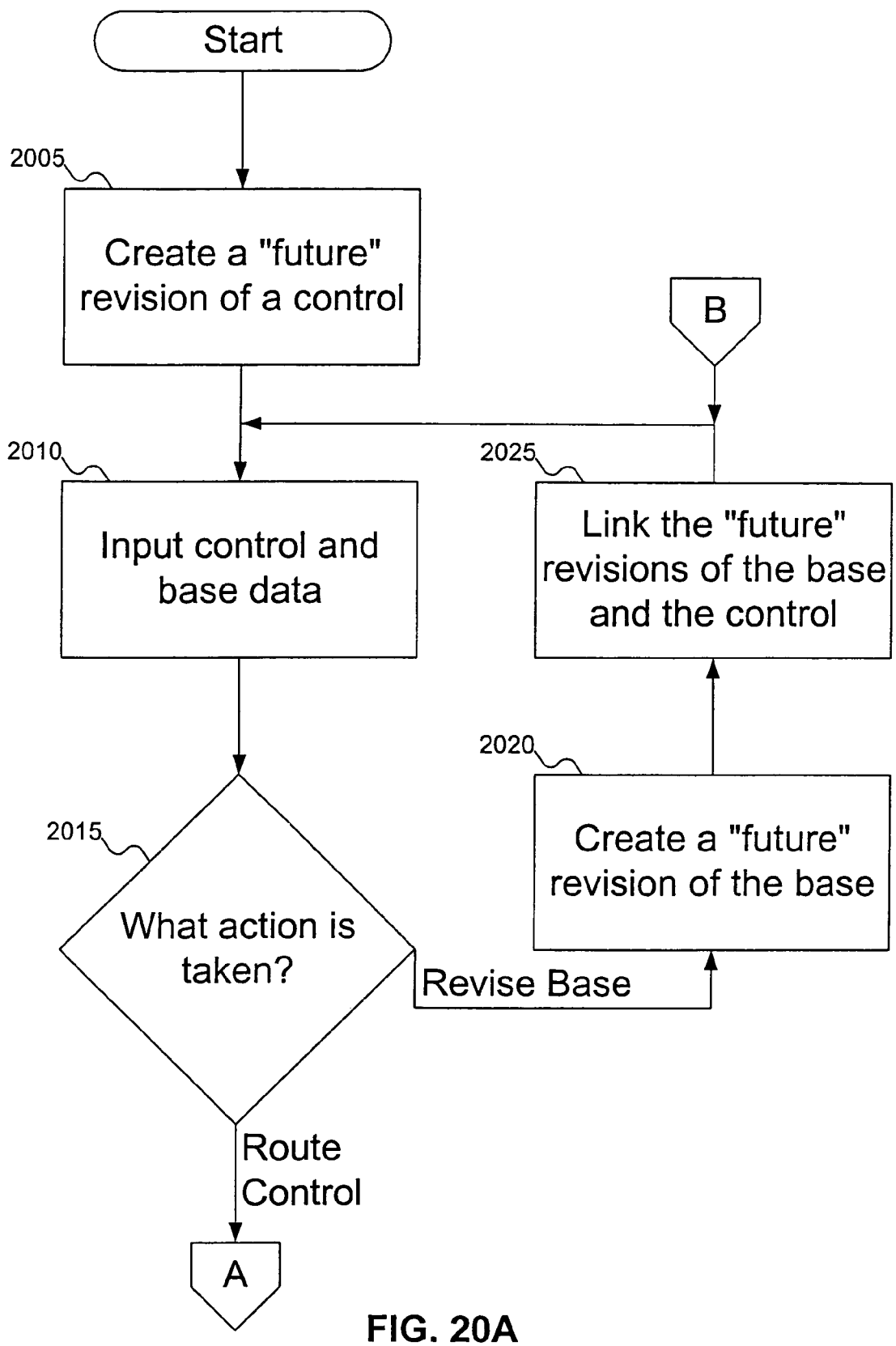
FIGS. 20A-20D show a flowchart of the procedure used to revise a base using a control according to the preferred embodiment of the invention.
Figure 20B:
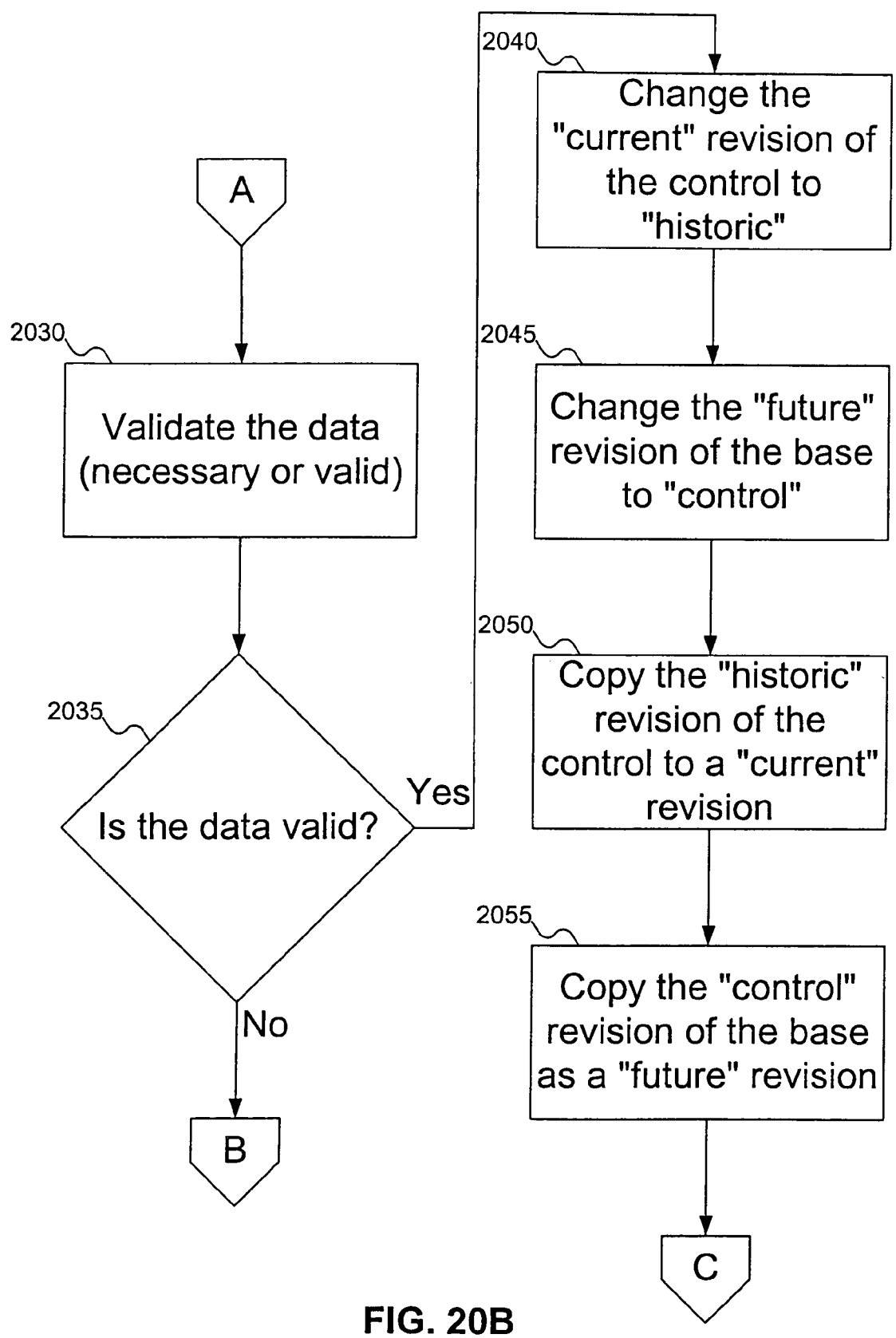
Figure 20C:
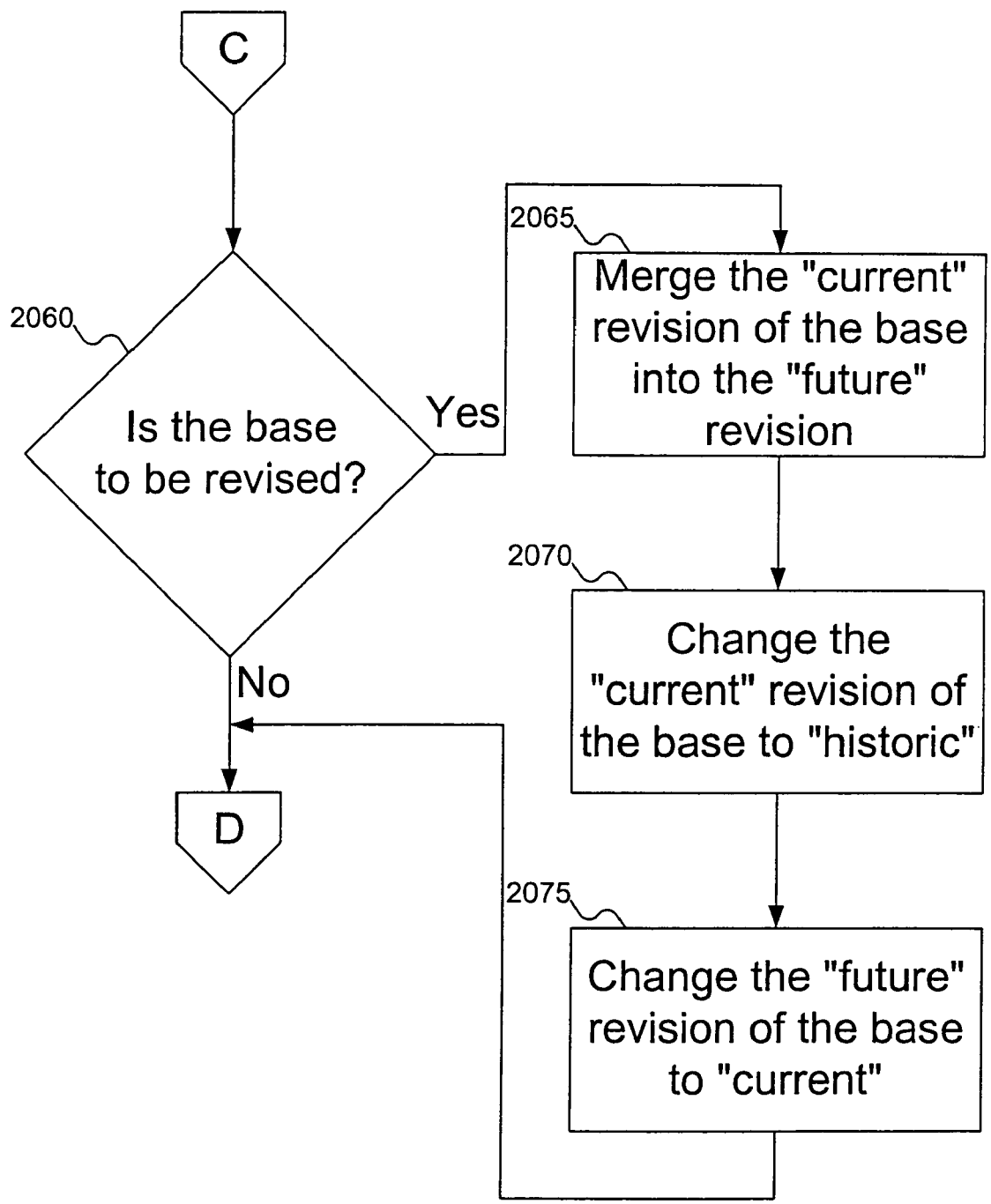
Figure 20D:
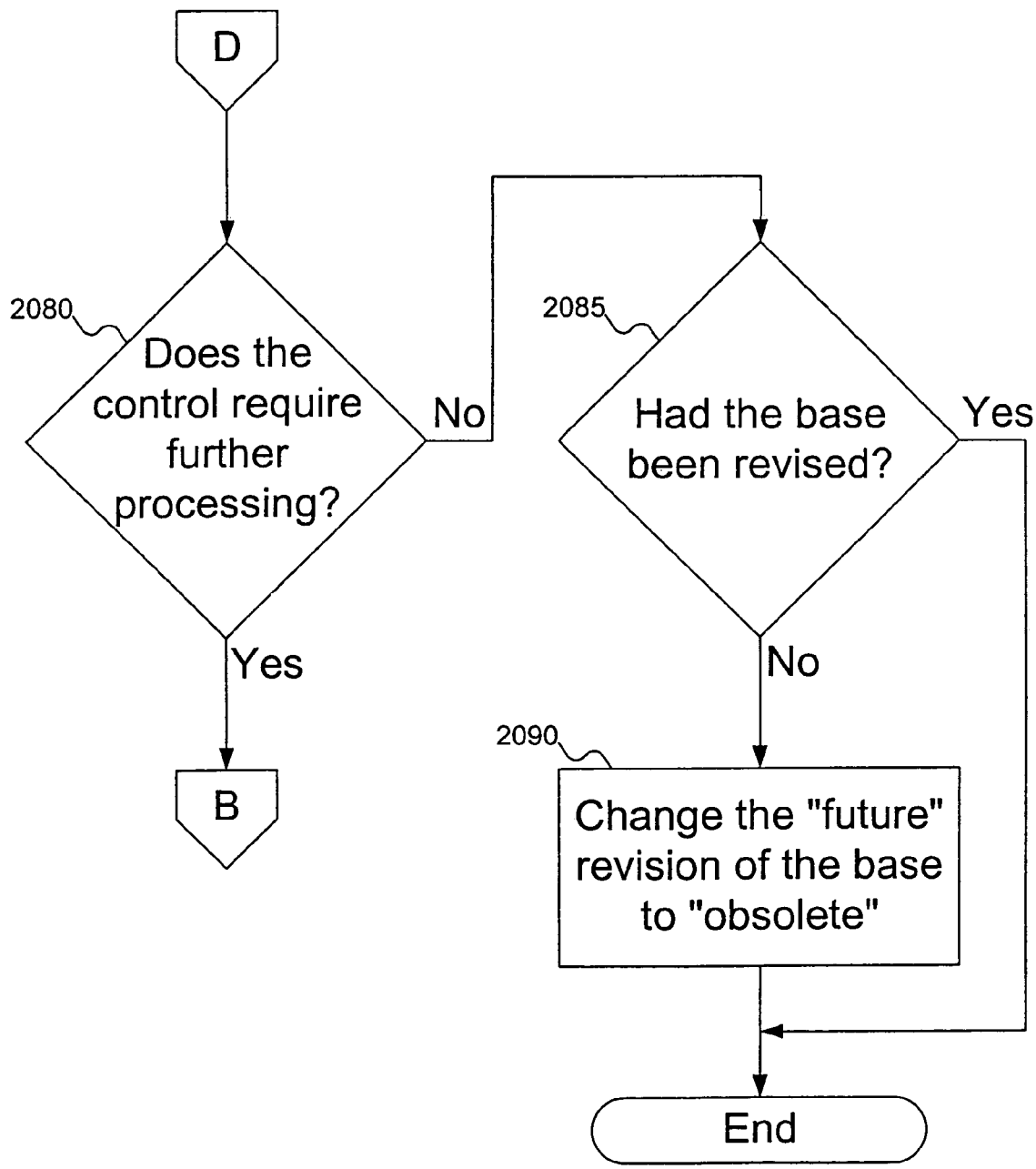

FIG. 19 shows the organization of data in the database of the computer system of FIG. 2. Hierarchy 1905 shows the relationships between the underlying relational database management system, the archetypes as described above, and the user interface. At level 0 (1910), a relational database management system is used to store the information. Level 1 (1915) includes the archetypes: base, control, intersection, and so on. Finally, level 2 (1920) represents the user interface, through which the database is accessed.

Level 1 (1915) holds the rules by which tables are created in level 2 (1920) to support the embodiment of the invention. For example, the rules of a base indicate that a base table has certain attributes and performs certain procedures on the table. But to show the architecture as in FIG. 19 is accurate but misleading. In the preferred embodiment of the invention, the archetypes are implemented in the application server. But a person skilled in the art will recognize that the archetype rules can be implemented in other ways. For example, the archetypes can be implemented as the procedures associated with the tables of the database, so that the tables themselves enforce the use of the archetypes. The archetype rules are then replicated in every occurrence of the user interface.

Although managing process design as described herein greatly improves process design, from the user's point of view nothing has really changed. For example, users can input data into forms using familiar field names and layouts. The enforcement of the rules of the archetypes is done behind the scenes. This means that users do not have to learn a new system to take advantage of the instant invention.

FIGS. 20A-20D show a flowchart of the procedure used to revise a base using a control according to the preferred embodiment of the invention. At step 2005 (FIG. 20A), a "future" revision of a control is created. At step 2010, control and/or base data are input. At step 2015, a switch occurs, based on what is to be done next. If a base is to be revised, then at step 2020, a "future" revision of the base is created. Then, at step 2025, the "future" revision of the base is linked to the revision of the control. The process then returns to step 2010.

Alternatively, if at step 2015 the control is to be routed, then at step 2030 (FIG. 20B) the data are validated to make sure that any necessary data are provided, and that all data provided is valid. At step 2035 the data are checked to see if the validation step (step 2030) succeeded. If the data was not valid, then the process returns to step 2010 (on FIG. 20A). Otherwise, at step 2040, the "current" revision of the control is changed to a "historic" revision. At step 2045, the "future" revision of the base is changed to a "control" revision. At step 2050, the "control" revision of the control is copied to a "current" revision. At step 2055, the "control" revision of the base is copied to a "future" revision. At step 2060 (FIG. 20C), the base is checked to see if it is to be revised. If the base is to be revised, then at step 2065 the "current" revision of the base is merged into the "future" revision of the base. At step 2070, the "current" revision of the base is changed to a "historic" revision, and at step 2075 the "future" revision of the base is changed to the "current" revision of the base.

At step 2080 (FIG. 20D), whether or not the base was revised at step 2060, the control is checked to see if it requires further processing. If it does, then the process returns to step 2010 (on FIG. 20A). Otherwise, at step 2085 the base is checked to see if it had been revised. If the base had not been revised, then at step 2090 the "future" revision of the base is changed to an "obsolete" revision. After step 2090, the process is complete.

Figure 21A:
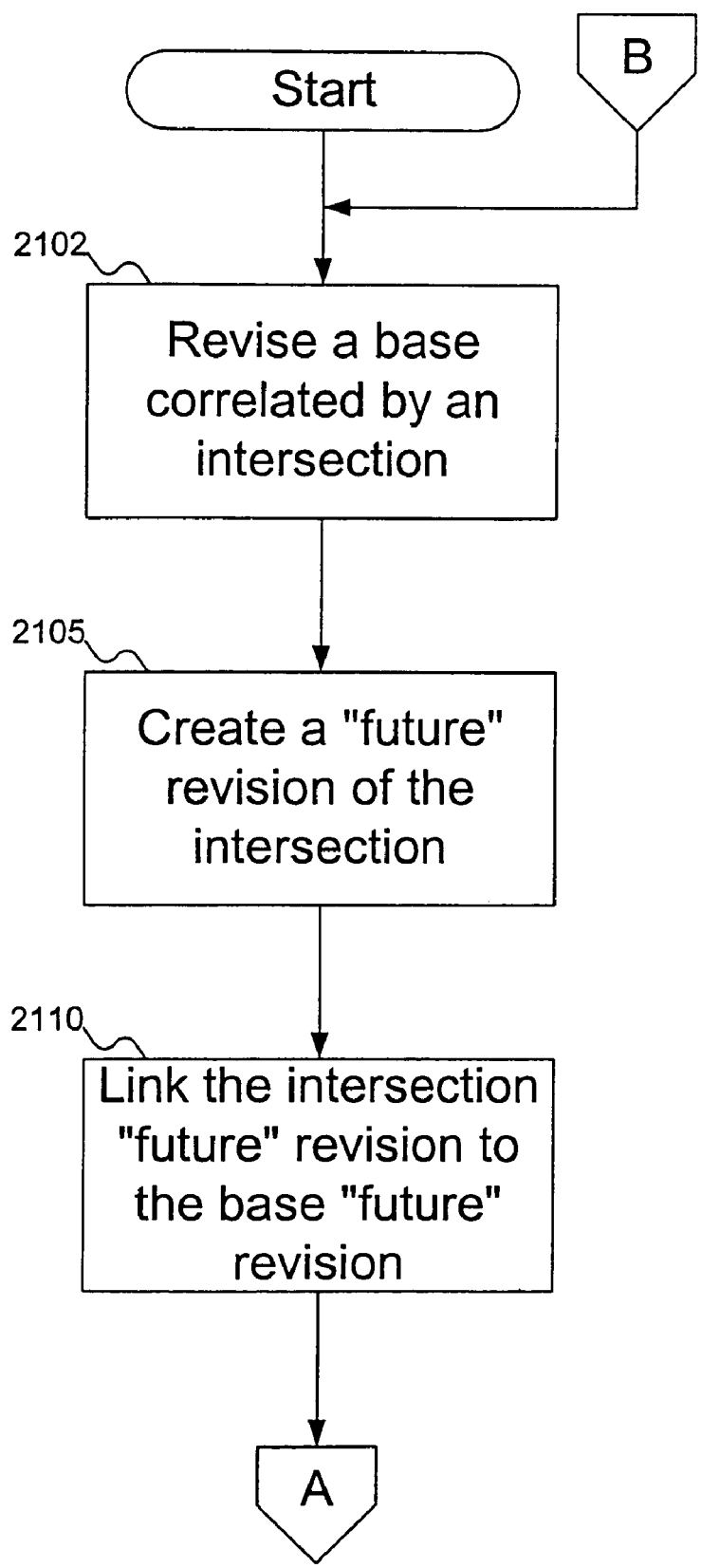
FIGS. 21A and 21B show a flowchart of the procedure used to revise an intersection when a base correlated by the intersection is revised, according to the preferred embodiment of the invention.
Figure 21B:
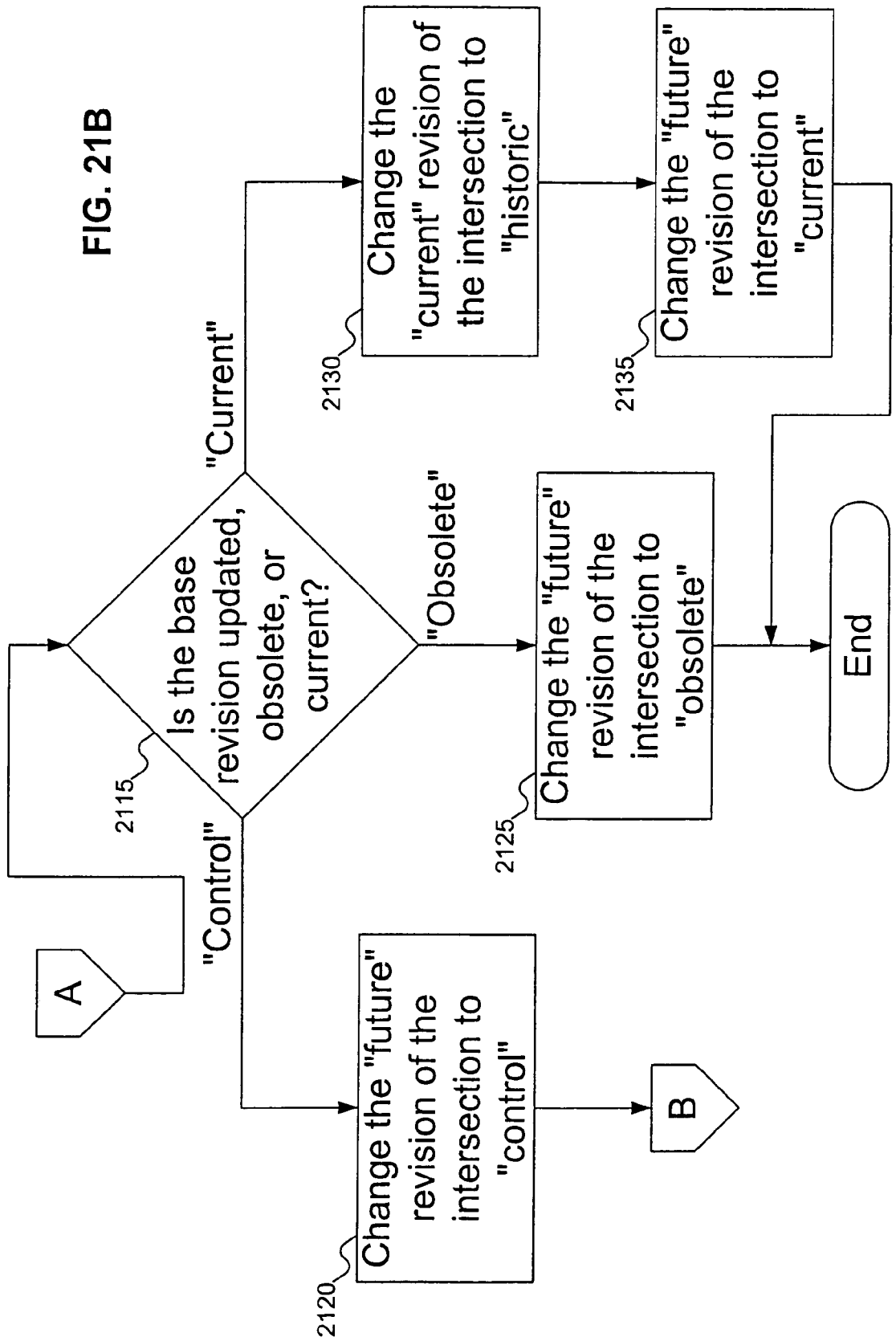

FIGS. 21A and 21B show a flowchart of the procedure used to revise an intersection when a base correlated by the intersection is revised, according to the preferred embodiment of the invention. At step 2102, a base correlated by the intersection is revised. At step 2105 (FIG. 21A), a "future" revision of the intersection is created. At step 2110, the "future" revision of the base is referenced in the "future" revision of the intersection. At step 2115 (FIG. 21B), the "future" revision of the base is checked to see what happened to it. (This can happen days, weeks, or longer after step 2110.) If the "future" revision of the base is changed to a "control" revision (i.e., the "future" revision of the base was updated to a new "future" revision), then at step 2120 the "future" revision of the intersection is also changed to a "control" revision, and the flowchart returns to step 2105 (FIG. 21A) to deal with the new "future" revision of the base. If the "future" revision of the base is changed to an "obsolete" revision, then at step 2125 the "future" revision of the intersection is also changed to "obsolete." Finally, if the "future" revision of the base is changed to a "current" revision, then at step 2130 the "current" revision of the intersection is changed to "historic," and at step 2135 the "future" revision of the intersection is changed to "current."

Figure 22A:
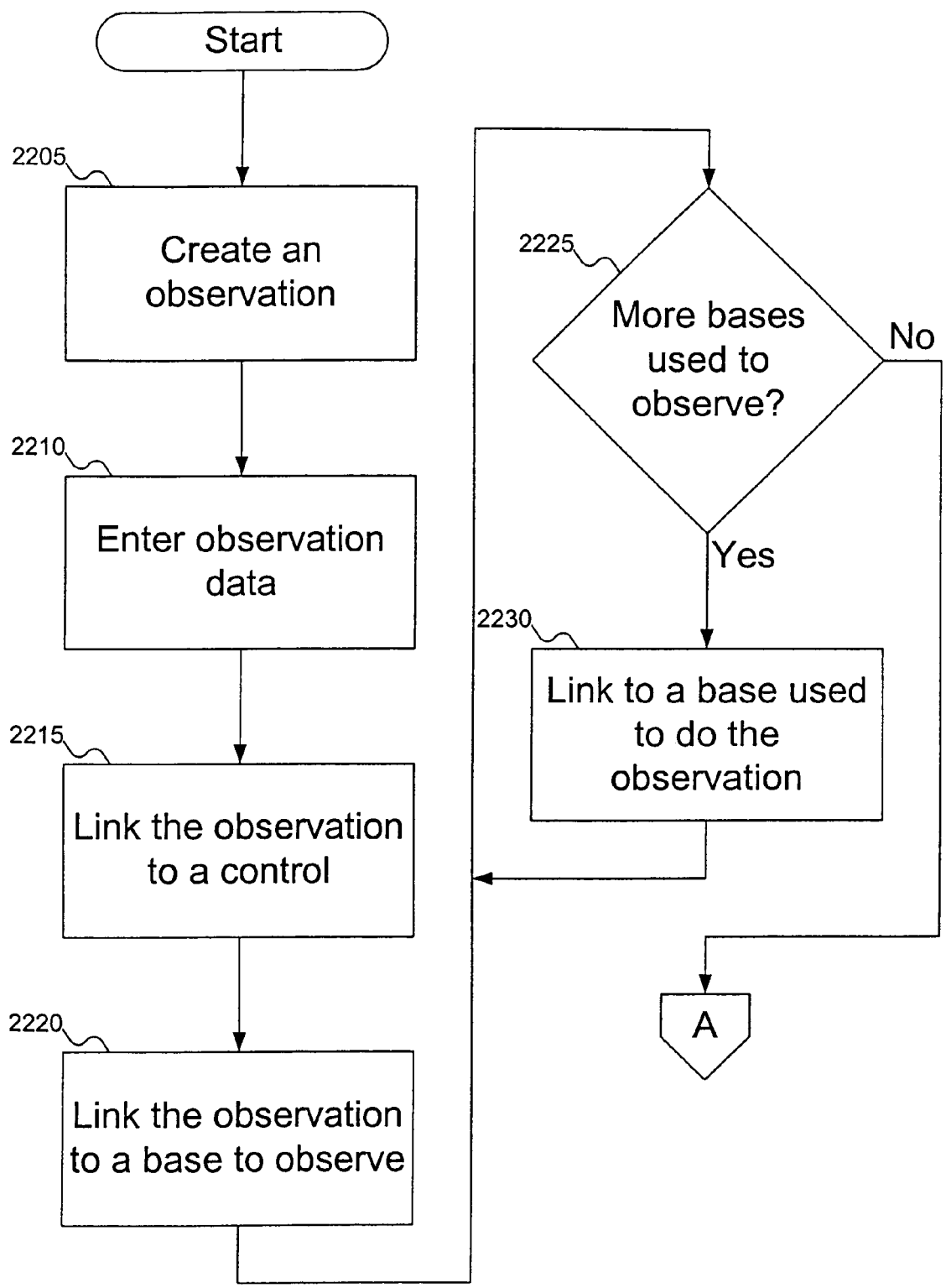
FIGS. 22A and 22B show a flowchart of the procedure used to make an observation of a base according to the preferred embodiment of the invention.
Figure 22B:
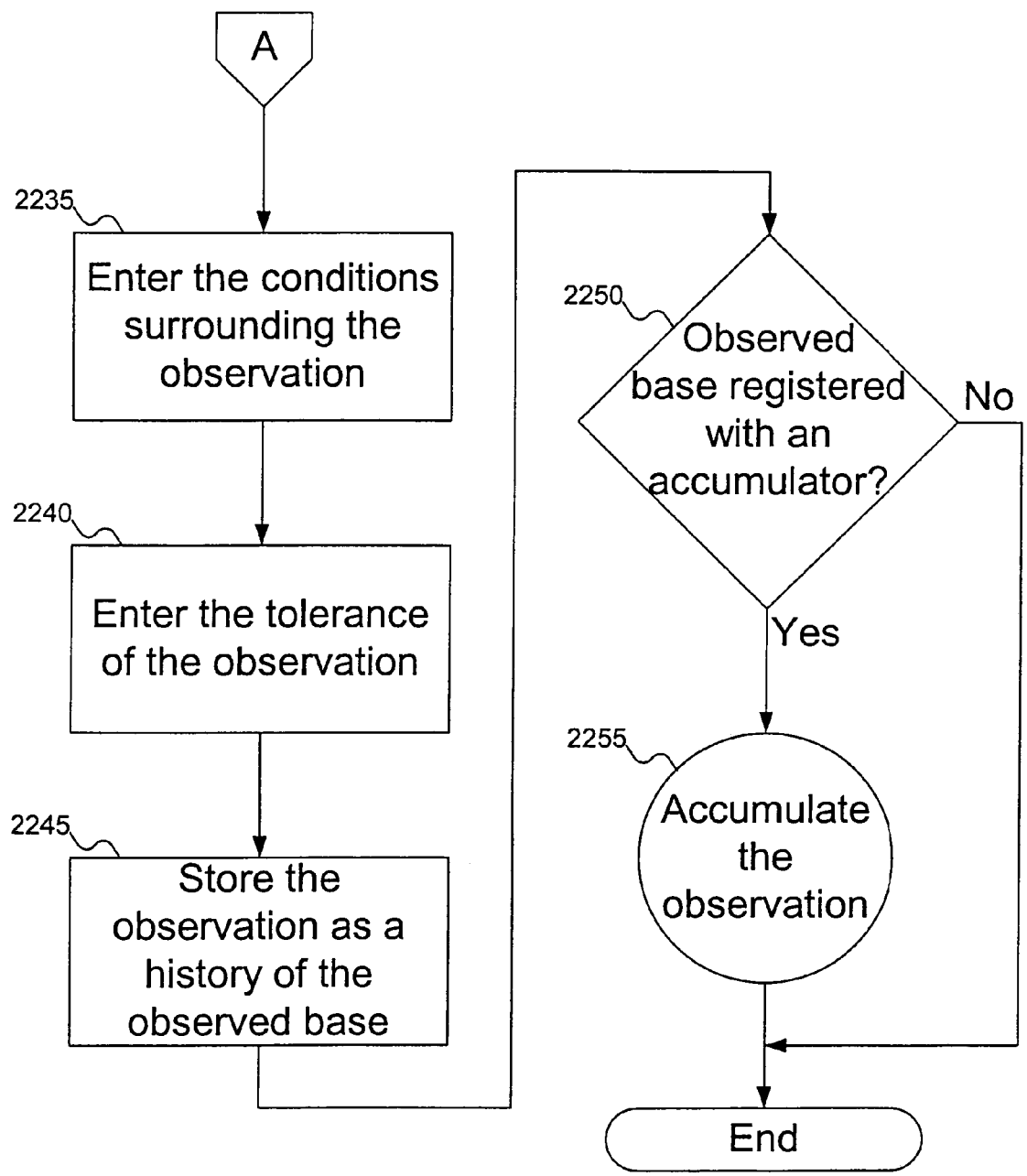

FIGS. 22A and 22B show a flowchart of the procedure used to make an observation of an instance of a base according to the preferred embodiment of the invention. At step 2205 (FIG. 22A), an observation is created. At step 2210, observation data are entered. At step 2215, the observation is linked to a control. At step 2220, the observation is linked to a base to be observed. At step 2225, a switch occurs, to see if any observing bases are to be linked to the observation. If there are more bases used to observe, then at step 2230 the observing base is linked to the observation. Otherwise, at step 2235 (FIG. 22B) the conditions surrounding the observation are entered. At step 2240, the tolerance of the observation is entered. At step 2245, the observation is stored as a history of the observed base. Finally, at step 2250, the observation is checked to see if it is registered with an accumulator. If the observation is registered with an accumulator, then at step 2255 the observation is accumulated.

Figure 23A:
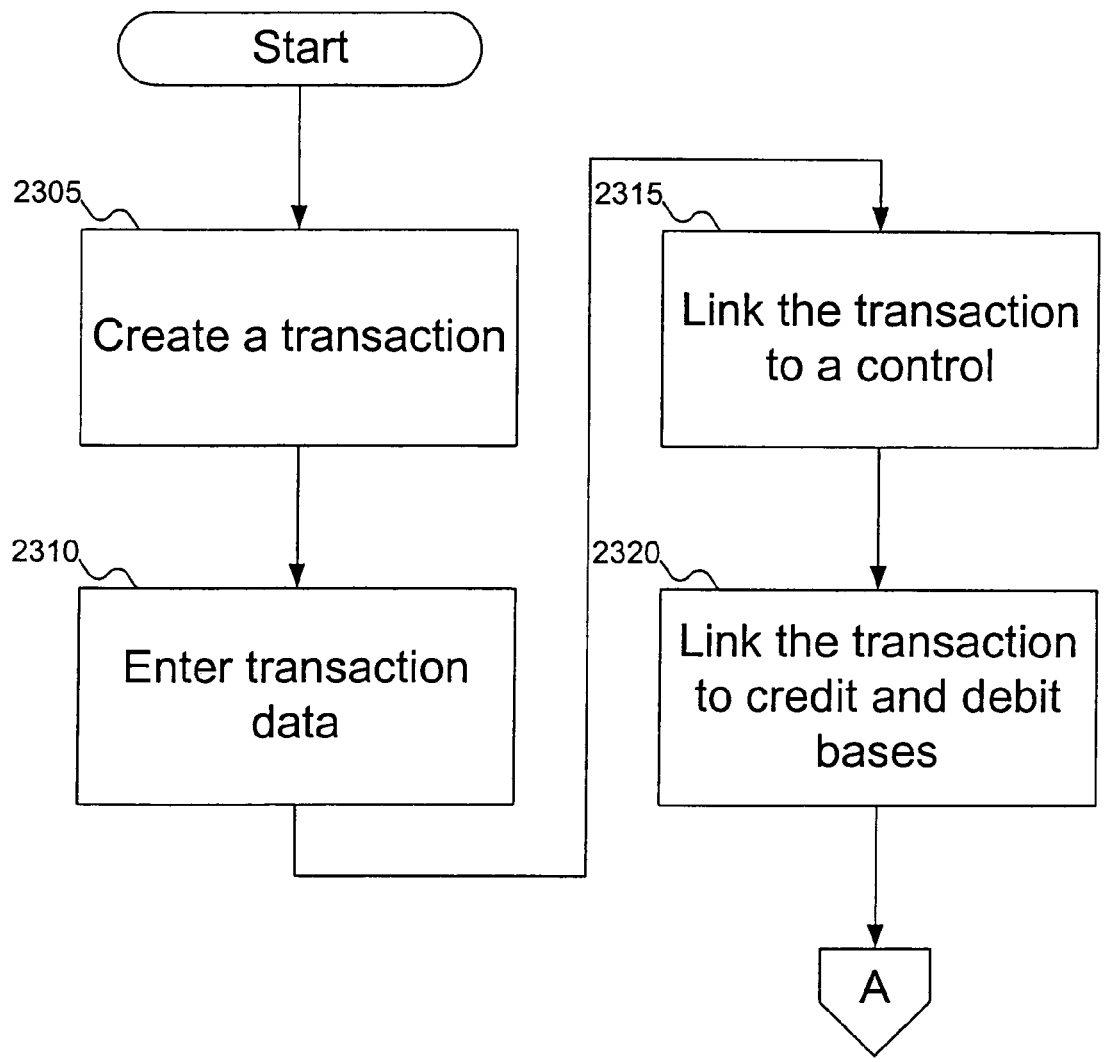
FIGS. 23A and 23B show a flowchart of the procedure used to execute a transaction according to the preferred embodiment of the invention.
Figure 23B:
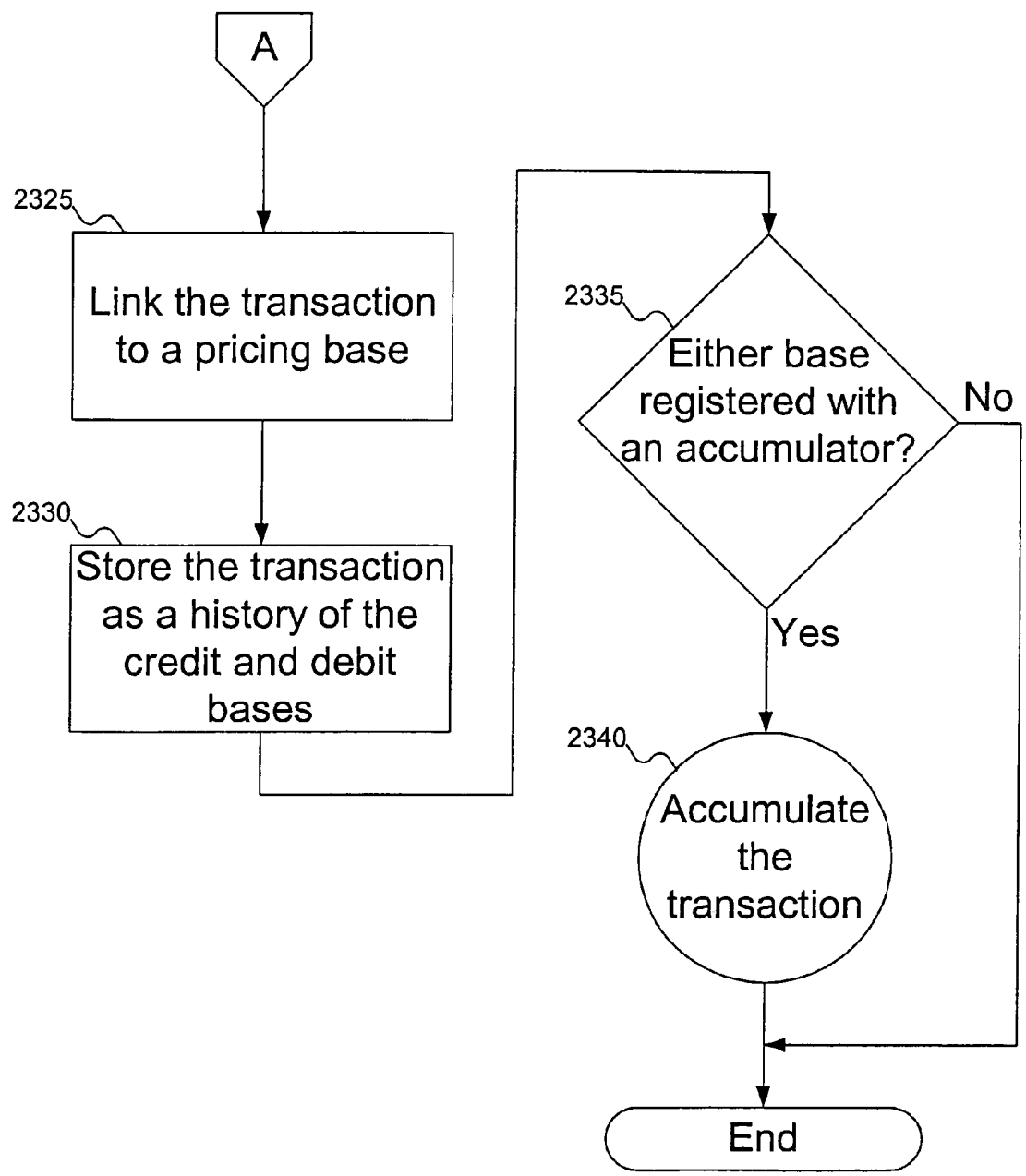

FIGS. 23A and 23B show a flowchart of the procedure used to execute a transaction according to the preferred embodiment of the invention. At step 2305 (FIG. 23A), a transaction is created. At step 2310, the transaction data are entered. At step 2315, the transaction is linked to a control. At step 2320, the transaction is linked to credit and debit bases. At step 2325 (FIG. 23B), the transaction is linked to a pricing base. At step 2330, the transaction is stored as a history of the credit and debit bases. Finally, at step 2335, the credit and debit bases are checked to see if either (or both) is registered with an accumulator. If either the credit or debit base is registered with an accumulator, then the transaction is accumulated.

Figure 24:
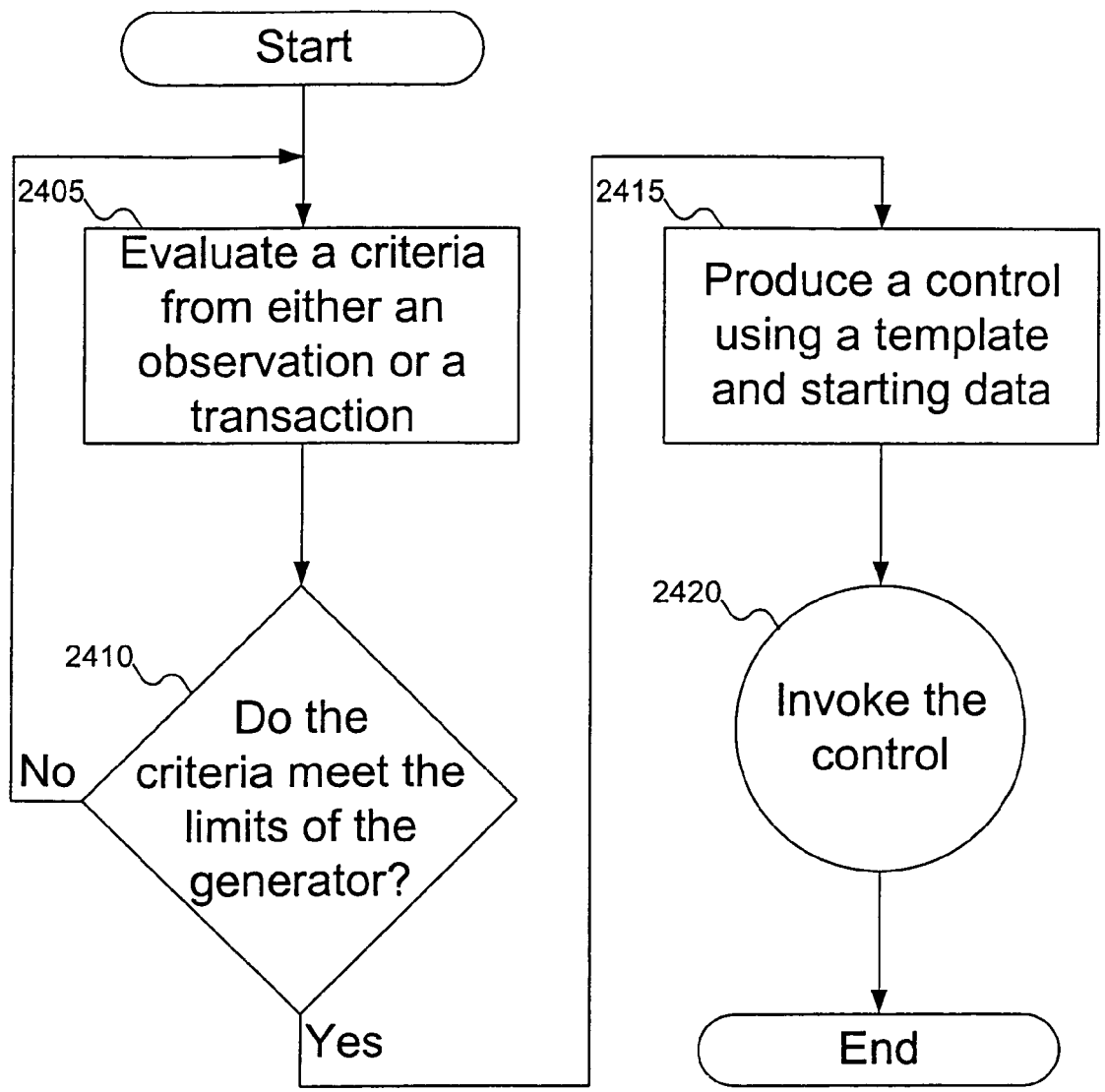
FIG. 24 shows a flowchart of the procedure used to generate a control using a template according to the preferred embodiment of the invention.

FIG. 24 shows a flowchart of the procedure used to generate a control using a template according to the preferred embodiment of the invention. At step 2405, criteria are evaluated, either from an observation, a transaction, or other archetypes. At step 2410, the evaluation is considered, to determine whether the criteria meets the limits of the generator. If the criteria do not meet the limits of the generator, then the flowchart returns to evaluate new criteria. Otherwise, at step 2415, a control is produced using a template and the starting data. Finally, at step 2420, the control is invoked.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. An apparatus for managing process design in a computer, the apparatus comprising:
   a computer, including a memory;
   a base stored in the memory, the base including information about an object in the process design; and
   a control stored in the memory, including information about a process in the process design, the control operable on the base.

2. An apparatus according to claim 1, wherein the base includes a revision of the base, the revision indicating a change in the information about the object in the base.

3. An apparatus according to claim 1, wherein the control includes a revision of the control, the revision indicating a change in the information about the process in the control.

4. An apparatus according to claim 1, further comprising:
   a second base including information about a second object in the process design;
   an intersection stored in the memory, designed to correlate the information in the base with the information in the second base; and
   a second control stored in the memory, including information about a process in the process design, the control operable on the intersection.

5. An apparatus according to claim 4, wherein the intersection includes a revision of the intersection, the revision indicating a change in the correlation of the information in the base with the information in the second base.

6. An apparatus according to claim 1, further comprising:
   a second base including information about a second object in the process design;
   a transaction stored in the memory, designed to transfer a resource from the base to the second base; and
   a second control stored in the memory, including information about a process in the process design, the control operable on the transaction.

7. An apparatus according to claim 1, further comprising:
   a second base including information about a second object in the process design;
   an observation stored in the memory, designed to observe the base from the perspective of the second instance of the base; and
   a second control stored in the memory, including information about a process in the process design, the control operable on the observation.

8. An apparatus according to claim 1, wherein the base can only be revised using the control.

9. An apparatus according to claim 1, wherein:
   the information in the control includes a field for a value, without which the control cannot operate; and
   the apparatus further comprises a second control stored in the memory, including information about a process in the process design, the second control operable on the control to supply the value for the field.

10. An apparatus according to claim 9, wherein the control is designed so that it cannot provide the value for the field.

11. An apparatus according to claim 1, wherein the base includes a future revision of the base, the future revision indicating a future change in the information about the object in the process design.

12. An apparatus according to claim 11, wherein the base further includes a second future revision of the base, the second future revision including a second future change in the information about the object in the process design.

13. An apparatus according to claim 12, wherein:
   the future revision of the base includes a third future change in the information about the object in the process design;
   the second future revision of the instance of the base includes a fourth future change in the information about the object in the process design; and
   the third future change in the future revision and the fourth future change in the second future revision are the same change.

14. An apparatus according to claim 1, wherein the base includes an ID of the control.

15. A computer-implemented method for managing process design, the method comprising:
   creating a future revision of a base;
   inputting data into the future revision; and
   making the future revision current.

16. A method according to claim 15, wherein making the future revision current includes retaining a prior revision of the base.

17. A method according to claim 16, wherein retaining a prior revision of the base includes changing a current revision to a historic revision.

18. A method according to claim 15, wherein inputting data includes inputting data relating to a changing field of the base into the future revision.

19. A method according to claim 15, further comprising validating the future revision.

20. A method according to claim 19, wherein validating the future revision includes checking that a necessary field has data.

21. A method according to claim 19, wherein validating the future revision includes making sure that a field in the future includes valid data.

22. A method according to claim 15, further comprising linking the future revision with a control.

23. A method according to claim 15, further comprising inputting data to a control of the base.

24. A computer-implemented method for correlating information between a first base and a second base, the method comprising:

creating a future revision of an intersection;

inputting data into the intersection, thereby correlating the first base and the second base; and making the future revision current.

25. A method according to claim 24, further comprising retaining a prior revision of the intersection.

26. A method according to claim 25, wherein retaining a prior revision of the intersection includes changing a current revision to a historic revision.

27. A method according to claim 24, further comprising lining the future revision with a control.

28. A method according to claim 24, further comprising inputting data to a control of the intersection.

29. A computer-implemented method for observing information about a first base from a second base, the method comprising:

creating an observation;

taking a measurement of information in the first base, from information in the second base; and storing the measurement in the observation.

30. A method according to claim 29, wherein taking a measurement includes determining the accuracy of the observation.

31. A method according to claim 29, wherein taking a measurement includes assigning a tolerance to the observation.

32. A method according to claim 29, wherein taking a measurement includes observing a condition surrounding the measurement.

33. A method according to claim 29, wherein storing the measurement includes keeping a prior measurement in the observation.

34. A computer-implemented method for performing a transaction between a first base and a second base, the method comprising:

identifying a resource in the first base;

move the resource from the first base to the second base; and paying the first base for the resource by the second base.

35. A computer-implemented method for generating a control, the method comprising:

evaluating a criterion using a generator;

generating starting data from the criterion;

producing a control using a template and the starting data; and invoking the control.

36. A method according to claim 35, wherein evaluating a criterion includes evaluating a criterion from an observation using a generator.

37. A method according to claim 35, wherein evaluating a criterion includes evaluating a criterion from a transaction using a generator.

38. A computer-implemented method for correlating information between a first control and a second control, the method comprising:

creating an intersection;

inputting data to a control of the intersection; and inserting at least some of the data into the intersection, thereby correlating the first control and the second control.

* * * * *

UNITED STATES PATENT AND TRADEMARK OFFICE
CERTIFICATE OF CORRECTION

PATENT NO.        : 7,254,594 B2
APPLICATION NO. : 10/861723
DATED             : August 7, 2007
INVENTOR(S)       : Kenneth R. Allen et al.

It is certified that error appears in the above-identified patent and that said Letters Patent is hereby corrected as shown below:

Title Page:

After Item (65)    "Prior Publication Data
                   US 2004/0220953 A1 Nov. 4, 2004"

Insert:  -- (60)   Related U.S. Application Data
                   Provisional application No. 60/214,495, filed Jun. 27, 2000 --;

Column 5, line 7, the word "farther" should read -- further --;
Column 7, line 54, the word "10;" should read -- 10, --;
Column 9, lines 39-40, the words "(state 1225). When" should read -- (state 1225) when --;
Column 12, line 51, the word "Employee" should read -- Employee 5 --;
Column 17, line 11, the word "lining" should read -- linking --.

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,254,594 B2 Page 1 of 1
APPLICATION NO. : 10/861723
DATED : August 7, 2007
INVENTOR(S) : Kenneth R. Allen et al.

It is certified that error appears in the above-identified patent and that said Letters Patent is hereby corrected as shown below:

On the Title Page, insert

-- Related U.S. Application Data
(62) Division of application No. 09/891,485, filed June 25, 2001, now U.S. Pat. No. 6,768,984, which claims benefit of application No. 60/214,495, filed June 27, 2000. --.

Signed and Sealed this

Twenty-ninth Day of June, 2010

David J. Kappos
*Director of the United States Patent and Trademark Office*